(12) United States Patent
Schmidt et al.

(10) Patent No.: US 8,944,232 B2
(45) Date of Patent: Feb. 3, 2015

(54) HYDRAULICAL SHIFTING DEVICE FOR AN AUTOMATIC TRANSMISSION

(71) Applicant: ZF Friedrichshafen AG, Friedrichshafen (DE)

(72) Inventors: Thilo Schmidt, Meckenbeuren (DE); Markus Herrmann, Scheidegg (DE); Hans-Joachim Martin, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 125 days.

(21) Appl. No.: 13/734,049

(22) Filed: Jan. 4, 2013

(65) Prior Publication Data

US 2013/0174722 A1 Jul. 11, 2013

(30) Foreign Application Priority Data

Jan. 9, 2012 (DE) .......................... 10 2012 200 202

(51) Int. Cl.
*F15B 15/26* (2006.01)
*F16H 63/34* (2006.01)
*F15B 20/00* (2006.01)
*F16H 61/02* (2006.01)

(52) U.S. Cl.
CPC ............. *F15B 15/26* (2013.01); *F15B 20/008* (2013.01); *F16H 61/0206* (2013.01); *F16H 63/3483* (2013.01)
USPC ....................................... 192/219.4; 192/221

(58) Field of Classification Search
USPC ...................................................... 192/219.4
See application file for complete search history.

(56) References Cited

U.S. PATENT DOCUMENTS

| 8,033,106 B2 | 10/2011 | Gierer et al. | |
|---|---|---|---|
| 2002/0084162 A1 * | 7/2002 | Schafer et al. | 192/219.4 |
| 2012/0160631 A1 | 6/2012 | Bauer et al. | |

FOREIGN PATENT DOCUMENTS

| DE | 41 27 991 A1 * | 2/1993 |
|---|---|---|
| DE | 10 2004 043 344 A1 | 4/2006 |
| DE | 10 2007 050 802 A1 | 4/2009 |
| DE | 10 2009 021 891 A1 | 12/2009 |
| DE | 10 2009 035 348 A1 * | 2/2011 |
| DE | 10 2010 028 759 A1 | 11/2011 |
| DE | 10 2010 043 257 A1 | 5/2012 |
| DE | 10 2010 055 859 A1 | 6/2012 |
| EP | 2 469 129 A1 | 6/2012 |

OTHER PUBLICATIONS

German Search Report Corresponding to DE 10 2012 200 202.2.

* cited by examiner

*Primary Examiner* — Rodney H Bonck
(74) *Attorney, Agent, or Firm* — Davis & Bujold, PLLC; Michael J. Bujold

(57) ABSTRACT

A hydraulic shifting device for an automatic transmission for engaging and disengaging a parking lock. The shifting device comprises a parking lock cylinder (203) for actuating the parking lock, and a parking lock valve (201) which, for hydraulic control of the parking lock cylinder (203), can be switched to at least first and second shift positions. In this case the hydraulic shifting device comprises a further parking lock valve (202), and the two parking lock valves (201, 202) and the parking lock cylinder (203) are designed and connected with one another in such manner that the parking lock can only be disengaged by pressurizing the parking lock cylinder (203) if the two parking lock valves (201, 202) are each switched to a particular shift position.

20 Claims, 11 Drawing Sheets

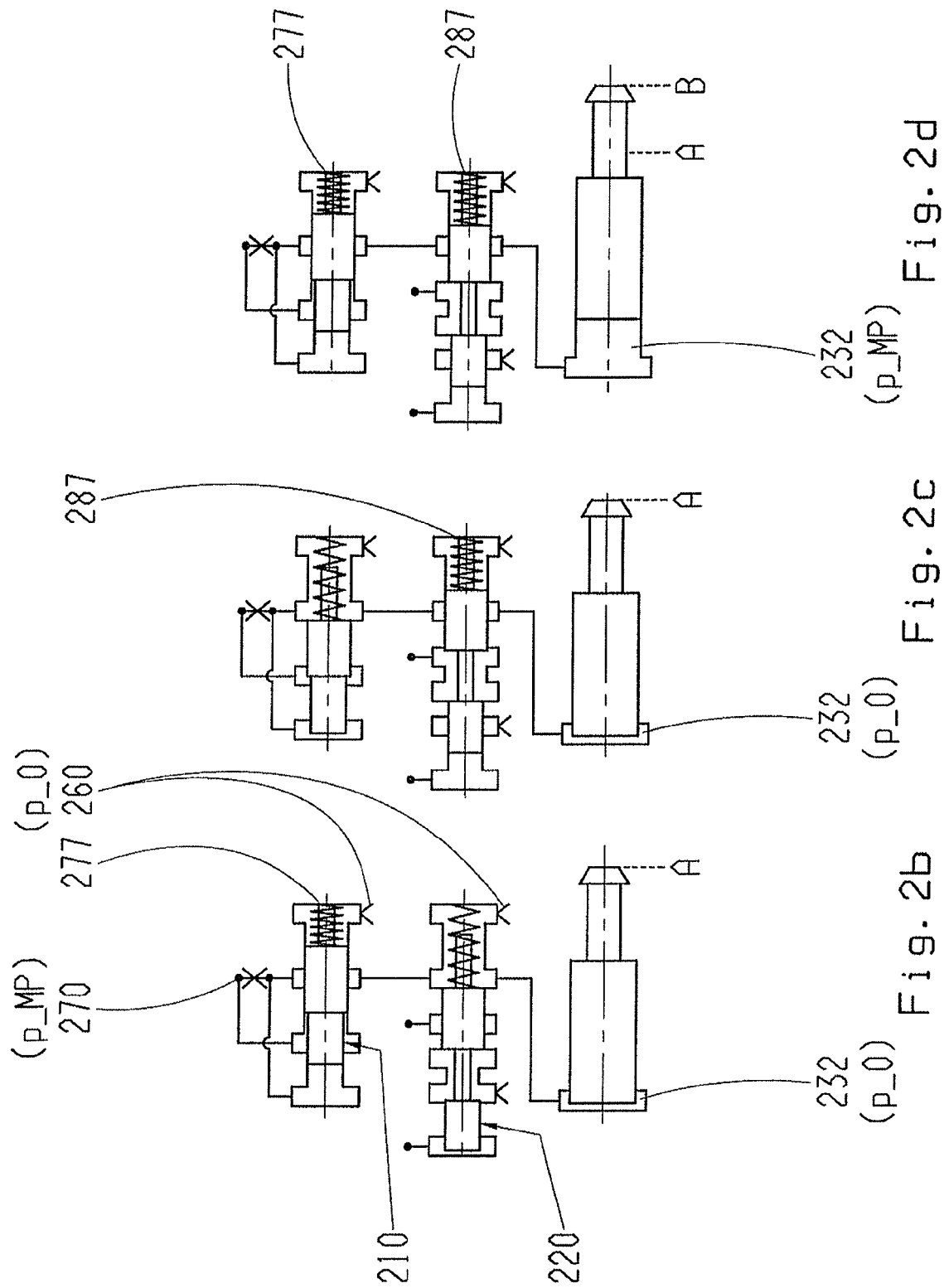

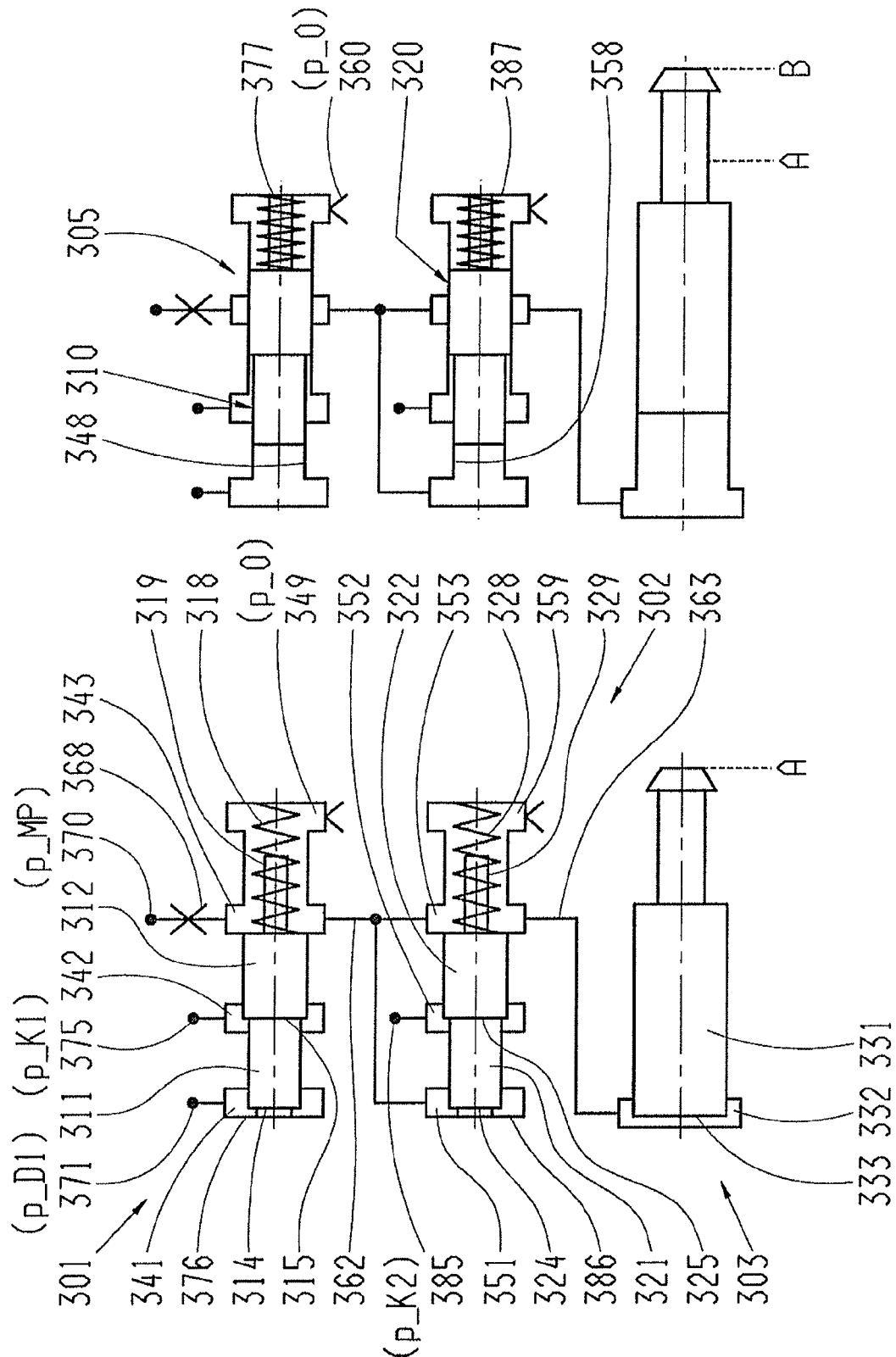

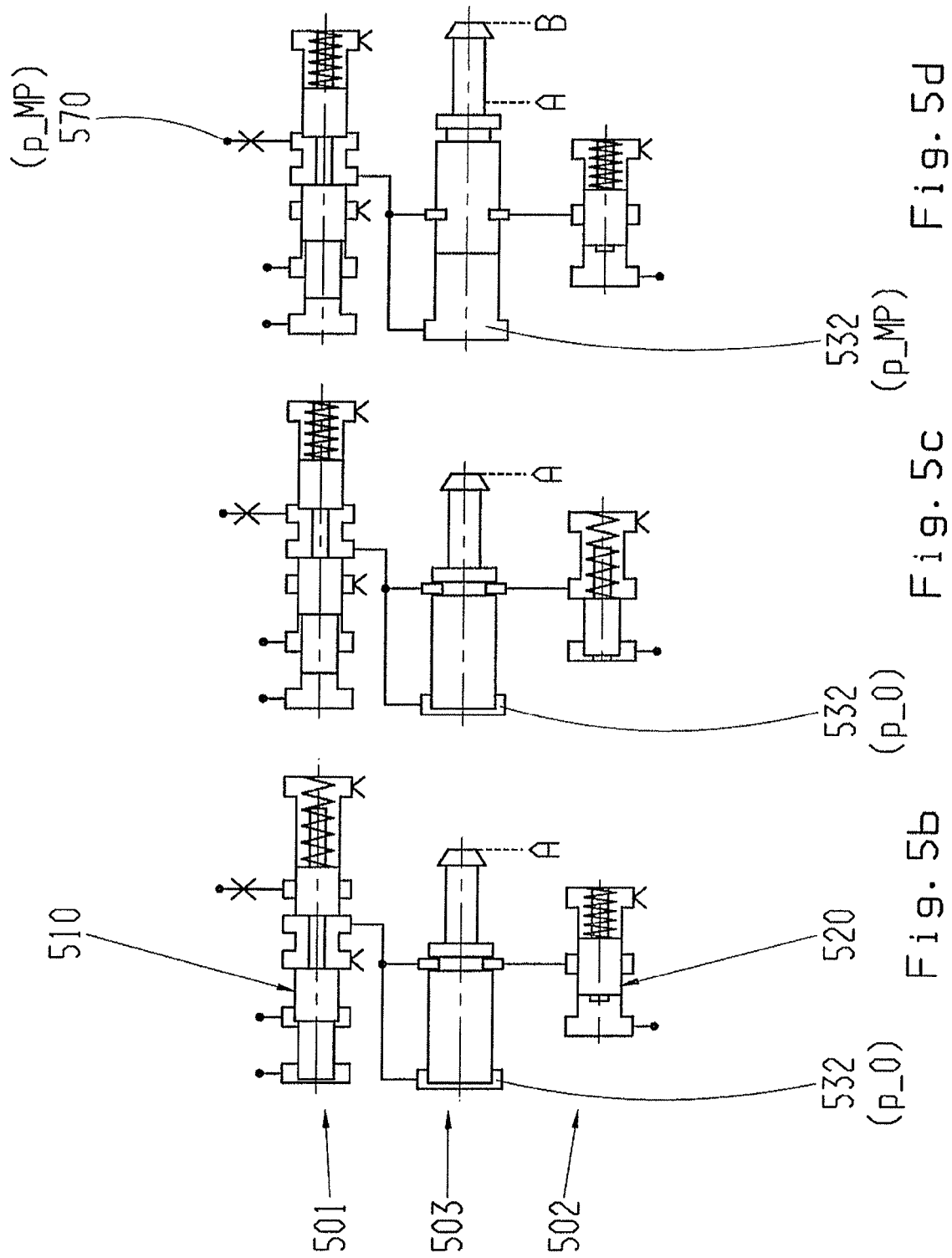

HYDRAULICAL SHIFTING DEVICE FOR AN AUTOMATIC TRANSMISSION

This application claims priority from German patent application serial no. 10 2012 200 202.2 filed Jan. 9, 2012.

FIELD OF THE INVENTION

The invention concerns a hydraulic shifting device for an automatic transmission, for controlling a parking lock.

BACKGROUND OF THE INVENTION

In vehicles with manually shifted transmissions it is possible by engaging a gear, in particular the first gear, to secure the vehicle when parked and with its engine stopped against rolling away, since when a gear ratio is engaged, a force link is formed between the drive wheels and the stationary crankshaft of the internal combustion engine. In automatic transmissions the force link when a gear is engaged in the transmission is formed by applying pressure to shifting elements. When a vehicle is parked, since the engine is stopped the pump of the automatic transmission is not being driven, so no actuating pressure can be built up. Accordingly, in the parked condition no force link can be formed between the drive wheels and the internal combustion engine. To secure a vehicle with an automatic transmission against rolling away a so-termed parking lock is arranged in the automatic transmission, which is designed as an interlocking, shiftable device for locking the output side of the transmission or the drive-train to the drive wheels.

The interlocking coupling elements of the parking lock are actuated by means of a piston of a hydraulic parking lock cylinder, which is controlled by a hydraulic shifting device of the transmission control system.

The disclosure document DE 102007050802A1 describes a transmission control system for an automatic transmission with an electro-hydraulic shifting device for controlling a parking lock. The electro-hydraulic shifting device in this case comprises a parking lock valve in the form of a 2/2-way valve with a valve slide and a compression spring, such that depending on the shift position of the valve slide, the parking lock cylinder is connected to a pressure oil supply held at a main pressure, or cut off from the pressure oil supply. When the parking lock cylinder is connected to the pressure oil supply a pressure chamber in the parking lock cylinder is acted upon by the main pressure, and the resulting displacement of a parking lock piston actuates the parking lock. Thus, in the parking lock cylinder the main pressure acts as the working pressure since in the parking lock cylinder hydraulic energy is converted into mechanical energy. In this case the pressure oil supply acts as the source of the working pressure. When the parking lock cylinder is acted upon by pressure, the interlocked connection of the parking lock is released, also said to be "disengaged". Analogously, the parking lock is "engaged" when the interlocked connection is in place and the output side of the transmission is locked.

The parking lock valve is connected to various pressure outlets of the transmission control system, denoted hereinafter as control pressure sources, and is controlled by their shifting or regulated pressures, also denoted as control pressures. These control pressures are understood to be pressures that actuate a valve or move a shifting element such as a valve slide to particular shift positions in which an operating medium from a working pressure source is delivered to a hydraulic consumer or cut off therefrom. In this case the valve slide of the parking lock valve is moved in opposition to the force of a spring, from a first shift position in which the pressure oil supply is cut off from the parking lock cylinder, to a second shift position in which the parking lock cylinder is acted upon by the main pressure.

The shifting of the valve slide of the parking lock valve in accordance with the prior art disclosed in DE 10 2007 050 802 A1 takes place by means of two electro-hydraulically adjustable control pressures which can act individually or in combination. In this case the parking lock valve has two pressure chambers, such that in a first pressure chamber, pressure from an electromagnetic pressure regulator can act upon a round axial surface with a circular cross-section. In this context the pressure from the electromagnetic pressure regulator is again referred to as the control pressure and the pressure regulator itself as the control pressure source. In the second pressure chamber an actuating pressure of a shifting element can act upon an annular axial surface of the valve slide. When the pressure chambers are pressurized, the valve slide is moved in opposition to the spring force.

In the selector lever position "P", which is set when a vehicle is parked, even if the engine is running and the pump is therefore delivering so that the main pressure is present, the two pressure branches are not pressurized, i.e. the two control pressures are virtually equal to zero, so the parking lock remains engaged. If as the result of a fault in the electromagnetic pressure regulators or in the electronic transmission control system that controls them at least one of the two control pressures is built up, the parking lock is disengaged and the vehicle can roll away. For that reason, in present-day systems the driver, when starting the engine, has to actuate the vehicle brakes in order to prevent unintentional rolling away of the vehicle.

In the future, in various markets a so-termed "Remote Start Function" will come into use, with which the driver will be able by operating a remote control device to start the engine in order to switch certain systems to a state of readiness for operation. With this function the previous safety strategy is disadvantageously no longer possible since the driver would not be in the vehicle if a fault as described above led to disengagement of the parking lock unless this had been diagnosed when the engine was stopped and the parking lock engaged. Thus, the vehicle could roll away without the driver being able to prevent this.

SUMMARY OF THE INVENTION

The purpose of the prevent invention is to provide a hydraulic system for controlling an electro-hydraulic parking lock actuation system for a transmission, which is used in a vehicle equipped with a so-termed "Remote Start Function".

A hydraulic shifting device for an automatic transmission for engaging and disengaging a parking lock comprises a parking lock cylinder for actuating the parking lock and a parking lock valve which, for the hydraulic control of the parking lock cylinder, can be shifted by at least one component or actuator to at least two shift positions. According to the invention, the hydraulic shifting device comprises a further parking lock valve. In this case the two parking lock valves and the parking lock cylinder are designed and connected to one another in such manner that the parking lock can only be disengaged by the action of pressure on the parking lock cylinder provided that the two parking lock valves are each switched to a particular shift position.

In the case of a hydraulic shifting device of the prior art having only one parking lock valve, if when the parking lock is engaged a fault were to occur in the components controlling the parking lock valve, for example in an actuator, as a result of which the shift position of the parking lock valve changed, this would lead to the undesired disengagement of the parking lock. However, since according to the invention there are two parking lock valves holding the parking lock engaged, provided that any one of the two parking lock valves remains in a particular shift position, a fault in a component associated with only one parking lock valve that results in a change of its shift position can advantageously not result in disengagement of the parking lock. In this context a fault in a component of only one parking lock valve is also referred to as a single fault. This redundant system, also referred to as AND logic, increases operational safety, especially when the vehicle has a Remote Start Function, i.e. a function that enables the vehicle engine to be started by remote control, since rolling away of the vehicle due to unintentional disengagement of the parking lock is avoided.

The components for changing the shift positions of the parking lock valve can be actuators such as hydraulic pressure regulators or hydraulic shifting elements whose pressure is controlled by an actuator. Likewise, electro-mechanical actuators for actuating the parking lock valve are conceivable.

In a preferred embodiment of the invention the parking lock valves each comprise a shifting element and are each in the form of displacement valves that can be switched to two shift positions, which direct a working pressure or the flow of operating medium from a working pressure source. The shifting element is moved by an actuator to different shift positions. The parking lock cylinder comprises a parking lock piston for actuating the parking lock, the parking lock piston being actuated by hydraulic pressurization from a source of working pressure. The first parking lock valve is connected at least to the first working pressure source. In a first shift position of the first parking lock valve the parking lock cylinder is hydraulically connected by the first parking lock valve to a vent regardless of the shift position of the second parking lock valve, so the parking lock is engaged.

In what follows, "vent" is understood to mean a space of the transmission control system or of an automatic transmission in which ambient pressure is present. A space connected to a vent and therefore also at ambient pressure is also said to be vented. Likewise the expression "unpressurized" is used, which is not correct in physical terms but expresses the fact that in this system no force can be produced by the ambient pressure since it acts upon every surface in all spatial directions.

Alternatively, besides the translational hydraulic action of the parking lock, rotational actuations, as for example by means of a hydraulic rotating motor are possible.

In what follows, a working pressure is understood to be a pressure acting upon a consumer such as a hydraulic motor or a hydraulic cylinder, the consumer being in a hydraulic system wherein the pressure is converted into a force or a torque. In contrast to the working pressure, in the case of a control pressure no consumer is supplied with hydraulic energy, but instead a hydraulic valve is moved or actuated or shifted.

In a second shift position of the two parking lock valves the working pressure source is connected by way of the first parking lock valve to the parking lock cylinder and the connection between the parking lock cylinder and the vent is interrupted or throttled by both the first and the second parking lock valves in such manner that a working pressure in the parking lock cylinder can increase to a value such that the parking lock piston can be actuated in order to disengage the parking lock.

In an advantageous design, in a position in which the parking lock is disengaged, the parking lock piston can be held by some electro-mechanical means in the disengagement position.

Advantageously, in each case the shifting element of the parking lock valve is in the form of a valve slide. Preferably, to reach its two shift positions the valve slide can be moved by an actuator within a valve bore in a control housing, as far as a first and a second stop. This design is advantageous since both the valve slide and the valve bore can be produced by simple production means.

Moreover, in addition to the valve slide a parking lock valve can have a spring. In an unpressurized, rest condition such as when the drive engine is stopped, the valve slide adopts a first shift position and is pre-stressed by the force of the spring, which is supported against a stop, toward the other stop. Thus, the movement of the parking lock piston takes place by the action of pressure in opposition to the force of a spring.

Alternatively, the valve slide can be pressed into its first shift position against the stop by a hydraulic force or by another control pressure, although this for example is not possible when there is no pressure in the transmission or when the engine has stopped.

In an embodiment of the invention it is provided that the parking lock valves are each connected to at least one control pressure source as a hydraulic actuator, so that the shifting elements can in each case be shifted to or held in the second shift position of the parking lock valve by control pressures produced in the control pressure sources. All the control pressures can be varied, i.e. increased or reduced, for example by means of an electronic control unit that influences the actuators. The working pressure can also be varied.

The valve bore in the control housing can extend through a plurality of parking lock chambers, at least one of which is connected to a control pressure source so that a control pressure can act in the corresponding pressure chamber. The valve slide has at least one axial surface which is acted upon from the respective pressure chamber by the control pressure as well, so that an axially directed force is exerted on the valve slide in the direction toward the second shift position.

In a variant of the invention the working pressure that actuates the parking lock piston of the parking lock cylinder can also be directed parallel to an axial surface of the valve slide, and can at the same time act there as a control pressure.

It is possible for at least one parking lock valve to be designed such that in the first shift position the valve slide can be acted upon only by a first control pressure and in its second shift position additionally by a second control pressure, in such manner that an axially directed force is exerted on the valve slide toward the second shift position. In this case the two control pressures are derived from different control pressure sources.

In a further embodiment it is provided that at least one parking lock valve is designed such that its valve slide, to be moved away from its first shift position, can be acted upon by a first and by a second control pressure in such manner that an axially directed force is exerted on the valve slide in the direction toward the second shift position.

In an advantageous variant of the invention it is possible, in at least one parking lock valve, for the valve slide in the second shift position, when the parking lock is disengaged, to be acted upon by a control pressure which, even if a power failure occurs in the transmission control system, exerts an axial force on the valve slide toward the second shift position, whereby the valve slide is held in the second shift position. This has the advantage that even if the transmission control system power fails the parking lock remains disengaged so that the vehicle can still be driven. The possibility of the parking lock remaining in the disengaged condition, or the valve slide remaining in its second shift position despite a power failure in the transmission control system is also referred to as the self-maintaining function. The corresponding control pressure acts in such a case as a so-termed self-maintaining pressure.

Advantageously, the two parking lock valves are connected to different control pressure sources. This prevents a single fault in one actuator affecting the shift position of both parking lock valves and resulting in undesired disengagement of the parking lock.

Alternatively, both parking lock valves can be connected to the same control pressure source and the pressure chambers and valve slides of the parking lock valves are then designed such that in the first shift position of the valve slides only one of the two valve slides can be acted upon by an axially directed pressure force from that pressure source. This prevents an undesired pressure increase in the one control pressure source concerned from affecting both valve slides.

Since the valve slide of each respective parking lock valve can advantageously be actuated in each case by two control pressure sources, the two parking lock valves can have a common control pressure source and two different control pressure sources, i.e. three control pressure sources. The division of the three control pressure sources in such a case must be such that the first control pressure source can move the valve slide of one parking lock valve and the second control pressure source can move the valve slide of the other parking lock valve to their respective first shift position. If both valve slides are in their respective second shift position, the valve slide of one parking lock valve is acted upon additionally by the second control pressure source and the valve slide of the other parking lock valve is acted upon by the third control pressure source. In other words the two parking lock valves are each actuated by two different control pressure sources, although both are connected to a common control pressure source. A fault in the common control pressure source, however, can only affect one parking lock valve thanks to the above-described arrangement in the respective first shift position of the parking lock valves.

In an advantageous embodiment of the invention it is possible for the first parking lock valve or the working pressure source to be connected by the second parking lock valve to the parking lock cylinder. This means that the operating medium from the working pressure source must flow first through the first parking lock valve and then through the second parking lock valve in order to reach the consumer, in this case the parking lock cylinder. In this case the first parking lock valve is not connected directly to the parking lock cylinder, since the second parking lock valve is arranged in the flow path between the first parking lock valve and the parking lock cylinder.

In a design alternative to this the first parking lock valve can be connected directly to the parking lock cylinder, so that the working pressure source can only be connected to the parking lock cylinder by way of the first parking lock valve, and the first parking lock valve and the working pressure source can be connected to the second parking lock valve by way of the parking lock cylinder. In this case both the first and second parking lock valves are connected directly to the parking lock cylinder, since no other valve through which the operating medium from the working pressure source has to flow is arranged in either case between the respective parking lock valves and the parking lock cylinder. For the operating medium to reach the second parking lock valve from the working pressure source, it has to flow first through the first parking lock valve and then through the parking lock cylinder.

With such an arrangement it is also possible for the two parking lock valves to be directly connected by a line in which a control pressure is present.

In this context it is provided that the parking lock cylinder has at least two pressure connections, the first pressure connection leading directly to the first parking lock valve and the second pressure connection leading directly to the second parking lock valve, while the parking lock piston is designed such that the parking lock cylinder acts as a switching valve by means of which the pressure connections can be connected to, or separated from one another.

In an advantageous design, this function is made possible if the parking lock piston has a control groove by which, in a first position of the parking lock piston when the parking lock is engaged, the two pressure connections and hence the two parking lock valves are connected to one another, while in a second position thereof when the parking lock is disengaged, they are separated from one another.

The control groove can also have any other geometrical shape which, in a given position of the parking lock piston, allows a hydraulic connection between the first and second pressure connections. For example, as an alternative to the control groove transverse bores through the parking lock piston perpendicular to its movement direction are conceivable.

This arrangement enables an advantageous design in which the second parking lock valve can be actuated from only a single control pressure source. The parking lock is disengaged when both parking lock valves are in their second shift position so that the parking lock piston is displaced to its second position. In its second position the second parking lock valve is cut off by the parking lock piston from the first parking lock valve and hence from the working pressure source. To retain the parking lock piston in the disengaged position in the event of a power failure, the valve slide of the first parking lock valve is held in its second shift position since the second control pressure source is chosen such that during a power failure it is not unpressurized or vented. Accordingly the hydraulic connection between the parking lock cylinder and the working pressure source is maintained and the parking lock piston is still acted upon by a working pressure. Regardless of the shift position of the valve slide of the second parking lock valve, no connection between the parking lock cylinder and a vent is possible since the second parking lock valve is cut off by the parking lock piston from the rest of the hydraulic shifting device. Since the second parking lock valve now does not have to be shifted to its second shift position in order to keep the parking lock disengaged, neither is any second control pressure acting in the event of a power failure needed. Because of this the valve slide of the second parking lock valve can be of simple and short design, which has advantages in terms of space, costs and production method.

In this context a further design of the hydraulic shifting device provides that the connection of the working pressure source to the vent, the second parking lock valve and the parking lock cylinder is interrupted by the valve slide of the first parking lock valve in its first shift position. Thereby, when the parking lock valve is in its first shift position the pressure medium cannot flow from the working pressure source to the vent, whereby the oil demand of the transmission control system and hence the energy losses are advantageously reduced.

In a preferred embodiment of the invention the valve bores of the two parking lock valves can have a common central axis. Advantageously, the two parking lock valves can be arranged one behind the other in a space-saving manner. As a further advantage, the valve bores of the two parking lock valves can be formed by simple production means in a single clamping operation.

Alternatively, the parking lock valves can be arranged one behind the other with an offset of their respective central axes.

Preferably an automatic transmission, in particular for driving a motor vehicle, comprises a hydraulic shifting device according to the invention or one of corresponding design for actuating a parking lock.

BRIEF DESCRIPTION OF THE DRAWINGS

A number of example embodiments of the invention are represented in the drawings and described in more detail below.

The drawings show:

FIGS. 2b-2d: Schematic representations of a first embodiment of a hydraulic shifting device according to the invention in various shift positions;

FIG. 3a: A schematic representation of a second embodiment of a hydraulic shifting device according to the invention in the shift position with the parking lock engaged;

FIG. 3b: A schematic representation of a second embodiment of a hydraulic shifting device according to the invention in the shift position with the parking lock disengaged;

FIGS. 5b-5d: Schematic representations of a fourth embodiment of a hydraulic shifting device according to the invention in various shift positions;

DETAILED DESCRIPTION OF THE PREFERRED EMBODIMENTS

Figures 1A, 1B:
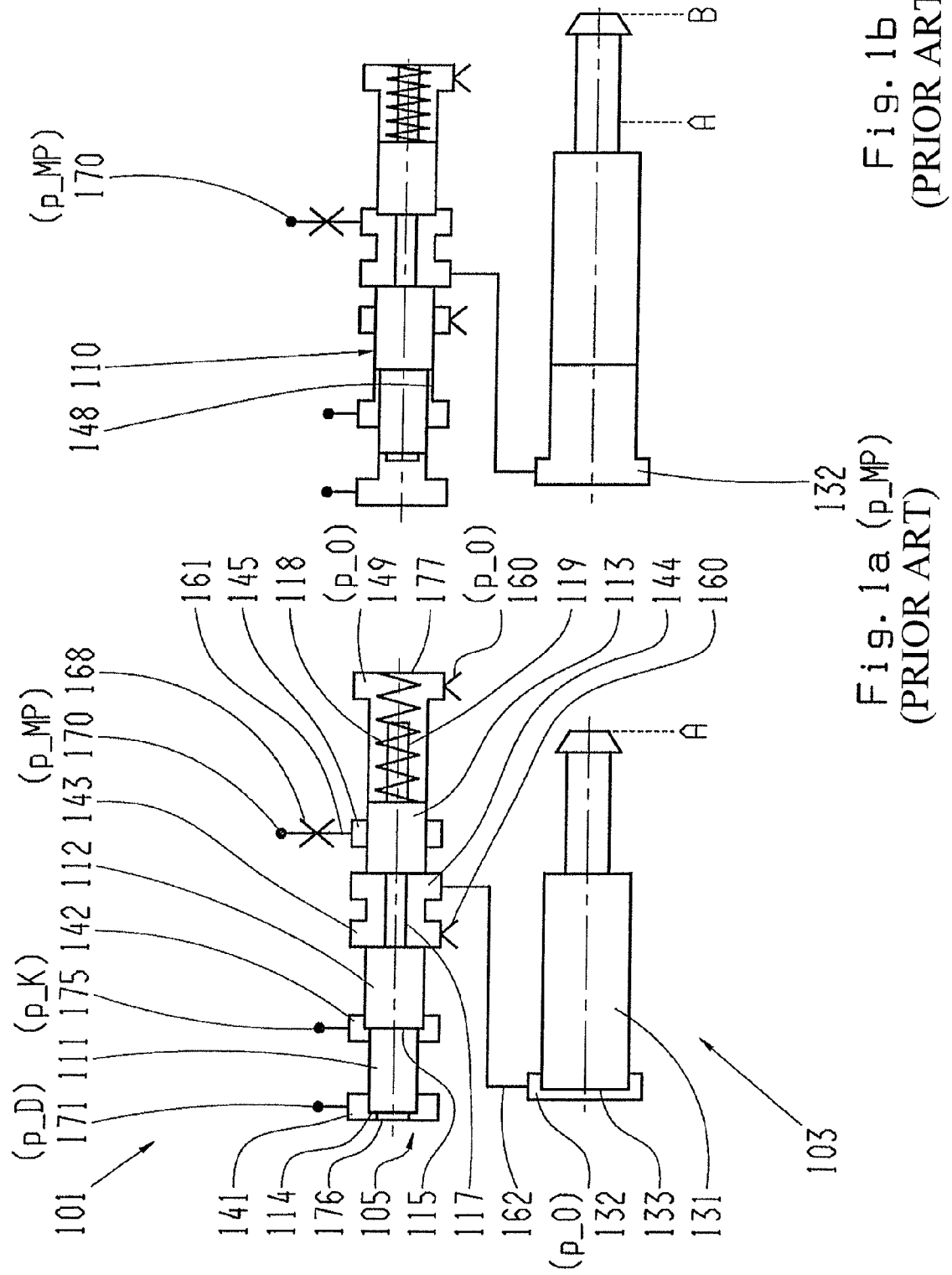
FIG. 1a: A schematic representation of a hydraulic shifting device of the prior art for actuating a parking lock in the engaged condition.
FIG. 1b: A schematic representation of a hydraulic shifting device of the prior art for actuating a parking lock in the disengaged condition.

FIG. 1a shows a schematic representation of a hydraulic shifting device of the prior art for actuating a parking lock. The hydraulic shifting device in this case comprises a parking lock valve 101 and a parking lock cylinder 103, of which at least the parking lock valve 101 is formed in a control housing 105. The parking lock valve 101 comprises a parking lock piston 110 and a spring 118. The parking lock piston 110 has a number of piston sections 111, 112 and 113 and a spring guiding pin 119 that serves to guide and center the spring 118. The various piston sections 111, 112 and 113 have circular cross-sections of varying diameter. Thus, in this example the piston sections 112 and 113 have the same diameter whereas the diameter of the piston section 111 is smaller. Between the piston sections 112 and 111 there is formed a radially extending annular surface by virtue of which, when acted upon by pressure, a force is exerted on the piston 110 in the axial direction. Owing to the action of this axial force, which is transmitted by such surfaces to the valve slide, the surfaces are also referred to as axial surfaces. The transition from the piston section 111 to the piston section 112 is an axial surface 115. The surface at the free end of the piston section 111 that can be acted upon by pressure in the axial direction is an axial surface 114. The size of the axial surface 115 is determined by the difference in area between the circular surface having the diameter of the piston section 112 and the axial surface 114. Between the piston sections 112 and 113 there is a recessed section 117 which forms a piston section whose diameter is smaller than that of the piston sections 112 and 113.

The valve slide 110 is arranged to move in its longitudinal direction between a first stop 176 and a second stop 177, within a valve bore 148, the valve bore 148 being formed in the control housing 105. The valve bore 148 is stepped to match the various diameters of the piston sections 111, 112 and 113, and thus extends through a number of pressure chambers 141 to 145 and a spring space 149 which is also formed in the control housing 105.

If in a shift position a piston section is located completely within a pressure chamber, as in FIG. 1a wherein the piston section 113 extends through the pressure chamber 145, the pressure chamber surrounds the piston section since the radial extension of the pressure chambers outward from a longitudinal axis to the valve bore 148 is larger than the largest inside diameter of the valve bore 148. This is the case with all the shifting devices in FIGS. 2 to 9. In the parking lock valve 101 described the pressure chambers 141, 142 and 145 are connected directly to a pressure oil supply 170 that acts as a working pressure source, whose pressure, a so-termed main pressure p_MP, can be varied. In this context "directly" means that a pressure branch in which a variable pressure is present, opens directly into the pressure chamber concerned without first flowing through any other pressure chamber. In all that follows a working pressure is understood to mean a pressure by which a consumer, for example a hydraulic motor or a hydraulic cylinder, is acted upon, the consumer being one in a hydraulic system, such that the pressure in the consumer is converted into a force or a torque. In contrast to the working pressure, in the case of a control pressure no consumer is supplied with hydraulic energy, but rather, a hydraulic valve is actuated or switched.

The pressure chamber 141 is connected to a pressure branch of the transmission control system in which a pressure-regulator pressure p_D of a pressure regulator 171 acting as a control pressure source is adjusted. Thus, in the pressure chamber 141 the axial surface 114 of the valve slide 110 can be acted upon by the pressure-regulator pressure p_D. The pressure chamber 142 is connected to a pressure branch in which a shifting element pressure p_K is present, which also acts on a shifting element 175 of the transmission. Thus, in the pressure chamber 142 the shifting element pressure p_K acts upon the annular axial surface 115. The shifting element 175 connected to the pressure chamber 142 is chosen having regard to the fact that the shifting element is required for obtaining a gear ratio, which shifting element, in the event of a power failure or when the transmission is not energized, is acted upon by pressure and is therefore closed, so making it possible to continue driving. The gear ratio is also referred to as the "fail-safe gear" in what follows.

The pressure chamber 145 is connected to the pressure oil supply 170, in which the main pressure p_MP is present. During operation this is produced by a transmission pump. The transmission pump can be driven mechanically by a drive motor which can be in the form of both an electric motor and an internal combustion engine. Between the pressure oil supply 170 and the pressure chamber 145, a hydraulic resistance, preferably a diaphragm orifice 168, is arranged in a hydraulic connection referred to as a line 161. In this context and also in the embodiments described later, the term "line" is understood as any hydraulic connection, such as ducts cast into a control block, bores made by machining, or connecting tubes. As a matter of principle the pressure-regulator pressure p_D and the shifting element pressure p_K cannot quantitatively exceed the main pressure p_MP, since they are produced by the main pressure p_MP for example by reduction. All the pressures, namely the main pressure p_MP, the shifting element pressure p_K and also the pressure-regulator pressure p_D, can be adjusted by means of a transmission control system and controllable actuators.

The pressure chamber 143 has a connection to part of the transmission in which a pressure approximately equal to the ambient pressure p_0 is present. Here and in all the embodiments described below this area is referred to as the vent. A pressure chamber connected to such an unpressurized space is also said to be "vented". At its two ends the valve bore 148 has respective stops 176 and 177 that limit the movement of the valve slide 110, as far as which the valve slide 110 can move so that it can adopt a first shift position and a second shift position. In the first shift position the valve slide 110 is against the stop 176 and in the second shift position it is against the stop 177. This definition of the shift positions also applies to all the later FIGS. The spring space 149 is also connected to a vent 160 and is therefore vented. In FIG. 1 and in the figures illustrating all the later example embodiments the vent 160 is represented by the symbol "^" which, however, is not indexed as such in all cases for the sake of simplicity. In each respective figure all the vent symbols imply the same index since all pressure chambers associated with that symbol are connected to a space in which the ambient pressure p_0 is present.

The parking lock cylinder 103 comprises a parking lock piston 131 and a cylinder pressure chamber 132. The parking lock piston 131 has an axial surface 133 facing toward the cylinder pressure chamber 132. The parking lock piston 131 can be moved axially by the action of pressure on the axial surface 133. In FIG. 1a the free end of the parking lock piston 131 is in a position A in which the parking lock piston 131 is in a pushed-in position. In the position A the parking lock is engaged, i.e. the drive-train of the transmission is connected in a rotationally fixed manner to the transmission housing or the vehicle and the drive wheels are therefore blocked, so that the vehicle is secured against rolling away. The cylinder pressure chamber 132 of the parking lock cylinder 103 is hydraulically connected by a line 162 to the pressure chamber 144 of the parking lock valve 101.

When the engine is stopped the transmission pump is static so that no operating medium is delivered and no pressure is produced in the transmission. If in this condition all the pressure chambers are unpressurized, then the valve slide 110 and the parking lock piston 131 are in the positions shown in FIG. 1a, i.e. the valve slide 110 is in its first shift position and the parking lock piston 131 is in position A.

If the parking lock piston 131 moves to a position B, the parking lock is disengaged (see FIG. 1b). Basically, i.e. in any conceivable embodiments of the hydraulic shifting device, the parking lock piston 131 can be held in position B by electro-mechanical means if, before the stopping of the drive engine, the parking lock was disengaged and the selector lever is not in the selector lever position "P". This is necessary for example to fulfill the so-termed "car-wash function", when the drive engine is cut off but the drive-train of the vehicle must not be blocked since the vehicle has to be able to roll.

The axial surface 114 of the valve slide is pressed by the force of the spring 118 supported by the valve slide 110 and the stop 177 on the spring side of the bore, against the stop 176 so that it adopts the first shift position. The parking lock piston 131 is pressed by a spring (not shown) against a stop on the pressure chamber side, so that the free end of the parking lock piston 131 is at position A in which the parking lock is engaged. In the selector lever position "P" as well, the valve slide 110 and the parking lock piston 131 adopt the position shown. In this position the piston section 113 cuts off the connection to the pressure oil supply 170, even when the main pressure p_MP has built up there. The cylinder pressure chamber 132 of the parking lock cylinder 103 is connected by the line 162 to the pressure chamber 144 and by the recessed section 117 to the vented pressure chamber 143, so that the cylinder pressure chamber 132 is unpressurized and at the level of the ambient pressure p_0.

If now, with the engine running and an appropriate selector lever position such as "N", "D" or "R" the pressure-regulator pressure p_D is increased, then a hydraulic force acts on the axial surface 141 and moves the valve slide 110 in opposition to the force of the spring 118 to the second shift position, which is reached when the spring guiding pin 119 contacts the stop 177 on the spring space side as shown in FIG. 1a. The same effect is produced by an increase of the shifting element pressure p_K, which acts on the axial surface 115 and moves the valve slide 110 in the same way. In this position of the valve slide 110, which is shown in FIG. 1b, the piston section 112 cuts off the pressure chamber 143 and hence the connection to the vent 160. The pressure chamber 144 is connected by the recessed section of the valve slide between the piston sections 112 and 113 to the pressure chamber 145 and hence to the pressure oil supply 170. Accordingly, by way of pressure chambers 144 and 145 and the line 162 the main pressure p_MP can enter the cylinder pressure chamber 132 and act upon the parking lock piston 131 via its axial surface 133. The free end of the parking lock piston 131 is therefore moved, in opposition to the force of the spring (not shown), to position B in which the parking lock is disengaged and the vehicle can start moving. If then a power failure occurs, the pressure-regulator pressure p_D in the pressure chamber 141 falls toward zero or is reduced to ambient pressure p_0.

It should be noted here that a distinction must be made between pressure regulators with a rising current-pressure characteristic and those with a falling current-pressure characteristic. In pressure regulators with a rising current-pressure characteristic the pressure being controlled increases as the value of the electric current flowing through the pressure regulator increases. This means that during a power failure the set pressure value theoretically falls to zero or to the ambient pressure p_0. In a pressure regulator with a falling current-pressure characteristic, the value of the pressure set decreases as the current increases, so that during a power failure the pressure being controlled adopts its maximum value. The latter property is relevant for example for emergency shifts, in which it must be ensured that if a power failure occurs in the transmission certain clutches are kept closed by maintaining the action of pressure upon them, so that a gear ratio is engaged in which it remains possible to move the vehicle along. In relation to the parking lock valve 101, with a pressure regulator having a falling current-pressure characteristic the valve slide 110 is still acted on by pressure and the parking lock remains disengaged. Thus, the drive-train of the vehicle is not blocked, so it can continue being driven.

If a pressure regulator has a rising current-pressure characteristic, then in the event of a collective power failure in the transmission or of damage to the pressure regulator concerned the pressure-regulator pressure p_D falls, so that the force produced by the pressure-regulator pressure p_D and acting in the pressure chamber 141 becomes smaller than the force of the spring 118 so that the spring 118 would move the valve slide 110 to the first shift position against the stop 176, so the parking lock would be engaged. Since this is not desired, the hydraulic shifting device is designed such that if the pressure-regulator pressure p_D in the pressure chamber 141 falls, the valve slide 110 is held by the shifting element pressure p_K acting in the pressure chamber 142 upon the axial surface 115 in the position shown in FIG. 1b and the parking lock remains disengaged. Then, driving can continue even in emergency ('fail-safe') operation. The possibility of the parking lock remaining in the disengaged condition or the valve slide remaining in its second shift position despite having no power in the transmission control system, is also referred to as the self-maintaining function. Thus, the shifting element pressure p_K acts as a self-maintaining pressure. The shifting element pressure p_K is the pressure of the shifting element which, to obtain the gear step specified for fail-safe operation, has to be closed and must therefore be acted upon by the shifting element pressure p_D. The maintaining of the shifting element pressure p_D even during a power failure is made possible, for example, by controlling it by means of a pressure regulator with a falling current-pressure characteristic. During a power failure the main pressure p_MP adopts the maximum value to which it can be set.

In another case the pressure regulator 171 with a rising current-pressure characteristic can fail and the pressure-regulator pressure p_D and the shifting element pressure p_K can nevertheless still remain—either because the pressure regulator 171 alone has failed or because, in the event of a collective power failure, the shifting element pressure p_K is set by a pressure regulator with a falling current-pressure characteristic. The shifting element pressure p_K then acts upon the axial surface 115, whereby the valve slide remains in its position against the stop on the spring space side as shown in FIG. 1b and the parking lock is then still disengaged.

If the selector lever position "P" is chosen, in which the vehicle is parked, and if the drive engine of the vehicle is stopped in the selector lever position "P", among other things the pressure-regulator pressure p_D and the shifting element pressure p_K acting as the self-maintaining pressure fall to zero, whereby the piston section 113 cuts off the inflow from the pressure oil supply 170. The cylinder pressure chamber 132 of the parking lock cylinder 103 is connected by way of the recessed section 117 and the pressure chamber 144 to the vented pressure chamber 143, so that the pressure on the parking lock piston 131 falls and it is moved by the spring (not shown) from its position B (FIG. 1b) back to its position A (FIG. 1a), so that the parking lock is engaged. Thus, even if the hand-brake has not been actuated the vehicle is secured against rolling away.

When the drive engine of the vehicle is re-started, which is only possible in the selector lever position "P", although a main pressure p_MP can build up in the transmission the two pressure chambers 141 and 142 remain unpressurized, so the parking lock remains engaged. However if, because of a fault in the electromagnetic pressure regulators or in the electronic transmission control system that control the pressure regulators, at least one of the two pressures—the pressure-regulator pressure p_D or the shifting element pressure p_K—builds up, then by virtue of the above-described action mode the parking lock is disengaged and the vehicle can roll away. For that reason, in present-day systems the driver, when starting the engine, is reminded to apply the hand-brake in order to prevent unintentional rolling away of the vehicle. The fault can even be that when the drive motor has stopped, the valve slide has remained stuck in its second shift position.

As mentioned earlier, in the future a so-termed "Remote Start Function" will come into use in various markets, which allows the driver by means of a remote control device to start the engine in order to switch certain systems to readiness for operation. Disadvantageously, with this function the previous safety strategy is no longer possible since the driver is not in the vehicle when a fault as described above results in disengagement of the parking lock, if the fault was not diagnosed when the engine was stopped and the parking lock engaged. Thus, disadvantageously the vehicle can roll away while the driver, outside the vehicle, has no way of preventing this.

Figure 2A:
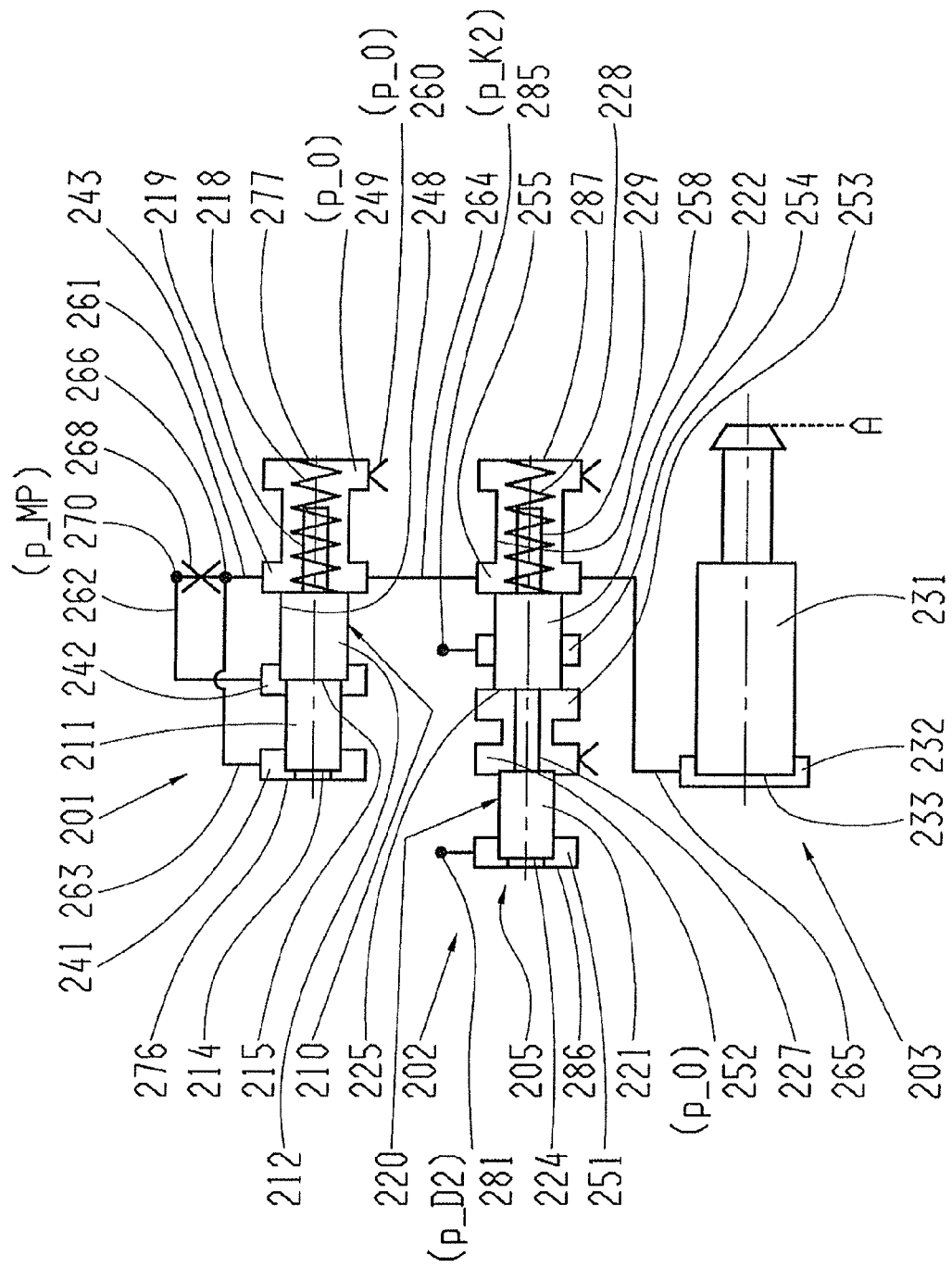
FIG. 2a: A schematic representation of a first embodiment of a hydraulic shifting device according to the invention with the parking lock in the disengaged condition.

FIG. 2a shows a hydraulic shifting device according to the invention, which prevents disengagement of the parking lock and thus rolling away of a driverless vehicle even if a single fault has occurred and the engine is started using the Remote Start Function. In contrast to that of the prior art, in addition to a first parking lock valve 201 and a parking lock cylinder 203 the shifting device according to the invention comprises a further parking lock valve 202. The two parking lock valves 201 and 202 are formed in a common control housing 205.

The parking lock valve 201 comprises a valve slide 210 and a spring 218. The valve slide 210 has two piston sections 211 and 212 with different diameters and a spring guiding pin 219 for guiding the spring 218. The area difference between the circular cross-sections of the piston sections 211 and 212 of different diameter determines the size of the annular axial surface 215 on the piston section 212. On the free end of the piston section 211 is formed an axial surface 214 whose size is determined by the diameter of the piston section 211. The valve slide 210, stepped because of the different diameters of the piston sections 211 and 212, is arranged to move axially within an also stepped valve bore 248 between two stops 276 and 277. The free end of the valve slide 210 or its axial surface 214 faces toward the stop 276. The stop 277 is formed at the spring-side end of the valve slide 210. The valve bore 248 extends through a number of pressure chambers 241, 242 and 243 and a spring space 249. The pressure chamber 242 is connected by a line 262 to a pressure oil supply 270, so that the annular axial surface 215 can be acted upon by a main pressure p_MP.

A line 261 also leads from the pressure oil supply 270 via a branching point 266 to the pressure chamber 243. Between the pressure oil supply 270 and the branching point 266 a hydraulic resistance, preferably a diaphragm orifice 268 is formed. The arrangement of a diaphragm orifice between the pressure oil supply and the hydraulic shifting device is intended among other things to reduce or suppress reactive effects of hydraulic processes such as pressure drops on the pressure oil supply. From the branching point 266 a line 263 leads to the pressure chamber 241, so that the axial surface 214 too can be acted upon by the main pressure p_MP. The spring space is vented, i.e. connected to part of the transmission in which the ambient pressure p_0 is present.

The second parking lock valve 202 comprises a valve slide 220 and a spring 228, the valve slide 220 having two piston sections 221 and 222 and a spring guiding pin 229. A recessed section 227 is formed between the piston sections 212 and 222. The diameter of the piston section 222 is larger than that of the piston section 221. At its free end the piston section 221 has an axial surface 224 whose size is determined by the diameter of the piston section 221. When the piston section 222 is acted upon by pressure from the side of the recessed section 227, as is possible for example in the second shift position as shown in FIGS. 2c and 2d, only one annular axial surface 225 is hydraulically effective, this surface being determined by the difference between the circular cross-sectional areas of the piston sections 221 and 222. The valve slide 220 is arranged to move axially within a stepped valve bore 258. The valve slide 220 can thus adopt a first position against a stop 286 and a second position against a stop 287.

The valve bore 258 extends through a number of pressure chambers 251, 252, 253, 254 and 255 and a spring space 259. The pressure chamber 251 is connected to a pressure regulator 281 as a control pressure source. Thus, the pressure chamber 251 and hence also the valve slide 220, via its axial surface 224, can be acted upon by a pressure-regulator pressure p_D. The pressure chamber 253 has no connection to the outside. The pressure chamber 255 is connected by a line 264 to the pressure chamber 243 of the parking lock valve 201. The pressure chamber 254 is connected hydraulically to a shifting element 285 which, to obtain a gear ratio in a fail-safe gear, must be closed and is therefore acted upon by a shifting element pressure p_K2 in the event of a power failure in the transmission control system.

As shown in FIGS. 2a and 2b, in the first shift position of the valve slide 220 the piston section 222 cuts off the connection from the pressure chamber 254 to other pressure chambers, in this example the pressure chambers 253 and 255. If when the engine is started an undesired shifting element pressure p_K2 builds up because of a fault, this cannot act upon the axial surface 225 and can therefore also not move the valve slide 220 to the undesired second shift position. Furthermore, to disengage the parking lock it is only necessary for the pressure regulator 281 to pressurize the pressure chamber 251, for which only a smaller quantity of oil is needed. Such an arrangement, in which a piston section in the first shift position of the valve slide cuts off adjacent pressure chambers from the one with a control pressure source, in particular a shifting element, is also found in the hydraulic shifting devices shown in FIGS. 4 to 9.

In the first shift position of the valve slide 220 shown, it is possible for a shifting element pressure p_K2 to act upon the shifting element 285 or in the pressure chamber 254, which is high enough to give rise to a leakage flow of the operating medium through a gap between the piston section 222 and the valve bore 258 into the pressure chambers 253 and 255. In the shift position shown, the pressure chamber 255 is vented both via the spring space 259 and also via the line 264, the pressure chamber 243 and the spring space 249 of the parking lock valve 201. So that no pressure can build up in the pressure chamber 253 which would exert a force on the valve slide 220 and cause it to move undesirably to its second shift position, the vented pressure chamber 252 is provided, which in the first shift position is connected by way of the recessed section 227 to the pressure chamber 253.

When the engine is off, the first shift positions of the parking lock valves 201 and 202 shown in FIG. 2a are adopted in the "P" position of the selector lever. No oil is delivered by the oil pump and thus, from the pressure oil supply 270 too, no main pressure p_MP builds up, or if the drive engine is running the main pressure p_MP is either zero or set at a value so low that the force of the spring 218 is larger than the pressure forces produced by the main pressure p_MP on the axial surfaces 214 and 215.

If the drive engine is now started—either by the driver in the vehicle or from outside the vehicle by means of a remote control device—the transmission pump delivers the operating medium to the hydraulic system of the transmission, and the operating medium, as a rule oil, also flows into the hydraulic shifting device from the pressure oil supply 270. First the main pressure p_MP builds up through the unthrottled line 262 in the pressure chamber 242, since the oil accumulates ahead of the diaphragm orifice 268. Through the line 261 and the throttle 268 the oil passes into the pressure chamber 243, which in this position of the valve slide 210 is connected to the spring space 249 and is therefore vented. During this the throttle 268 prevents any reactive effect upon the pressure oil supply 270 which would result in a drop of the main pressure p_MP.

Consequently, some of the oil flows directly to the vent 260 and into a transmission sump (not shown). By way of the line 263 and the branching point 266 and the pressure chamber 243, the pressure chamber 241 is also vented. Another part of the operating medium passes via the line 264 into the pressure chamber 255 which is also connected to the vent 260. The cylinder pressure chamber 232 of the parking lock cylinder 203 is thus vented by way of the line 265 and both of the parking lock valves 201 and 202, so that no pressure can build up in it and the parking lock therefore remains engaged.

If now, during the engine start phase, the main pressure p_MP increases due to some fault, then owing to its action on the axial surface 215 there is also an increase of the pressure force that moves the valve slide 210 against the force of the spring 218 to a second shift position, which is reached when the spring guiding pin 219 encounters the stop 277 as shown schematically in FIG. 2b. In the second shift position the piston section 212 now interrupts the connection between the pressure chamber 243 and the vented spring space 229. However, since the pressure chamber 243 is now positioned in a ring around the piston section 212, there is still a connection from the pressure oil supply 270 to the vent 260, namely by way of the pressure chamber 243, the line 264 and the pressure chamber 255 of the second parking lock valve 202, which in this position of the valve slide 220 is connected to the vented spring space 229. The cylinder pressure chamber 232 of the parking lock valve 203 is therefore also vented via the line 265 and the pressure chamber 255. Another reason for the valve slide 210 of the parking lock valve 210 to be in the second position is that the valve slide 210 may remain stuck and be jammed in the second position when the drive engine in stopped. So that the parking lock valves 201 and 202 cannot both be moved to the second shift position because of a faulty pressure setting in only one pressure source, in this case the pressure oil supply 270, the pressure regulator 281 or the shifting element 285, the parking lock valves or their valve slides and valve bores and pressure chambers, and their interconnections, are designed in such manner that one and the same pressure source can never exert an axial pressure force on both valve slides.

FIG. 2c shows the position of the parking lock valves 201 and 202 in the event that a fault occurs in the components that control the second parking lock valve 202 or that the valve slide 220 remains stuck when the drive engine is stopped. Due to an unintended action of pressure in the pressure chamber 251 by the pressure-regulator pressure p_D caused by faulty control of the pressure regulator 281, the effect of the pressure force acting on the axial surface 224 is to move the valve slide 220 in opposition to the force of the spring 228 from its first to its second shift position, which is reached when the spring guiding pin 229 encounters the stop 287. The valve slide 220 can also be in the second shift position because when the drive engine was stopped it was in that position and has remained stuck there. In the second shift position of the valve slide 220 the piston section 222 cuts off the line 264 and the line 265 from the vented spring space 259. The connection between the lines 264 and 265 and hence the connection between the cylinder pressure chamber 232 of the parking lock cylinder 203 and the vented spring space 249 is maintained via the pressure chamber 255, which surrounds the piston section 222. Accordingly the cylinder pressure chamber 232 is still vented and the parking lock is still engaged.

In this way, even with a Remote Start Function and when a single fault of the components occurs, it is ensured that the parking lock remains engaged and the vehicle is secured against rolling away. However, if faults resulting in the undesired action of pressure on both of the parking lock valves 201 and 202 were to occur, the parking lock would unintentionally be disengaged. To ensure that from a single fault acting on only one parking lock valve no dual fault affecting both parking lock valves can occur, the pressure sources whose pressures could act upon the valve slides are always different for the two parking lock valves 201 and 202. This basic principle applies in every embodiment having two parking lock valves.

Only if, when the drive engine is started in the selector lever position "P", the main pressure p_MP rises above a certain threshold value and the pressure-regulator pressure p_D erroneously acts in the pressure chamber 252—i.e. if a double error occurs—are both valve slides 210 and 220 moved to the second shift position as shown in FIG. 2d, so that the cylinder pressure chamber 232 is cut off from any vent and can be acted upon by the main pressure p_MP. When the pressure chamber 232 is pressurized in this way, a pressure force acts on the axial surface 233 of the parking lock piston 231 and moves the piston in opposition to the force of a spring (not shown) to position B, whereby the parking lock is disengaged.

When the selector lever is moved to position "D" in which starting off must be possible, the parking lock has to be disengaged and the valve slides 210 and 220 must therefore be moved to their second positions shown in FIG. 2d. To do this the main pressure p_MP that in this embodiment acts simultaneously as the working and the control pressure, and the pressure-regulator pressure p_D2 that acts as the control pressure, are increased and in the manner described above the parking lock valves 201 and 202 are switched in such manner that the pressure oil supply 270 is cut off from the various connections to the vent 260 and the cylinder pressure chamber is therefore pressurized so that the parking lock is disengaged. If a power failure in the transmission electronics occurs during driving, it must be ensured that the parking lock remains disengaged so that the vehicle can continue being driven. The pressure regulators of the transmission control system are designed and connected in such manner that if a power failure occurs a gear is engaged, which is referred to as the so-termed fail-safe gear.

In the second position the main pressure p_MP acts upon the axial surfaces 214 and 215. The sizes of the axial surfaces 214 and 215 are chosen such that the value of the main pressure still present if a power failure occurs is still sufficient to produce a pressure force that exceeds the force of the spring 218, so that the valve slide 210 remains in the second position.

If the valve slide 220 is switched to the second position by pressurizing the pressure chamber 251, then the connection of the pressure chamber 253 to the vent 260 is interrupted by the piston section 221 in the pressure chamber 252. By virtue of the recessed section 227, the pressure chambers 253 and 254 are connected to one another, so that the axial surface 225 is acted upon by the shifting element pressure p_K2. In all the embodiments described, the corresponding shifting element 285 is always a shifting element required for obtaining the fail-safe gear and which is closed when not energized.

If the pressure regulator 281 has a rising current-pressure characteristic, the pressure-regulator pressure p_D in the pressure chamber 251 falls to the ambient pressure p_0. However, since the shifting element pressure p_K is still acting on the axial surface 225, the valve slide 220 is held in its second position. In this case the shifting element pressure p_K acts as a self-maintaining pressure.

FIG. 3a shows a schematic representation of a further design of a shifting device according to the invention when the parking lock is engaged. The hydraulic shifting device has two parking lock valves 301 and 302 and a parking lock cylinder 303. In the first parking lock valve 301 a valve slide 310 is arranged to move axially in a valve bore 348 between two stops 376 and 377. The valve slide has two piston sections 311 and 312 with different diameters. The valve bore 348 extends through three pressure chambers 341, 342 and 343 and a spring space 349. The pressure chamber 341 is hydraulically connected to a pressure regulator 371 and can therefore be acted upon by a pressure-regulator pressure p_D1. The pressure chamber 342 is connected to a shifting element 375 and can therefore be acted upon by a shifting element pressure p_K2. The pressure chamber 343 is connected by way of a hydraulic resistance, in this example a throttle 368, to a pressure oil supply 370 which is at a main pressure p_MP. The spring space 349 is connected to a vent 360 and is therefore vented, so that the ambient pressure p_0 is present in it.

The second parking lock valve 302 has a valve slide 320 designed similarly to that of the parking lock valve 301, which can move in a valve bore 358 between two stops 386 and 387. The valve slide 320 has a piston section 321 whose diameter is smaller than that of a piston section 322. The valve bore 358 extends through three pressure chambers 351, 352 and 353, and a vented spring space 359. The pressure chamber 343 of the parking lock valve 301 is connected by a line 362 both to the pressure chamber 351 and to the pressure chamber 353 of the parking lock valve 302. In turn, the pressure chamber 353 is connected by a line 363 to a cylinder pressure chamber 332 of the parking lock cylinder 303. The pressure chamber is connected to a shifting element 385 as its pressure source and can thus be acted upon with a shifting element pressure p_K2. Basically, in all the embodiments the two valve slides cannot be acted upon and moved by one and the same control pressure source, since if that were possible a single fault in the control pressure source or in the pressure regulator concerned could then affect both valves and disengage the parking lock.

In the engaged condition of the parking lock, as for example in selector lever position "P", the two valve slides 310 and 320 are respectively against the stops 376 and 386. The free end of the parking lock piston 331 is in position A.

In the cylinder pressure chamber 332 even if oil is flowing into the shifting device from the pressure oil supply 370 no pressure can build up, since it is vented by way of the lines 363 and 362 and the pressure chambers 353 and 343. The oil flowing in runs directly into the transmission sump or other parts of the transmission in which the ambient pressure p_0 is present.

When the drive engine is started, if the pressure chamber 341 is erroneously pressurized by the pressure-regulator pressure p_D or due to pressurizing of the pressure chamber 342 by a shifting element pressure p_K, the valve slide 310 is moved to its second position in which the spring guiding pin 329 is in contact with the stop 377. In this position, although the piston section 312 cuts off the pressure chamber 343 from the vented spring space 349, the pressure oil supply 370 is still connected to the vent 360 by way of the pressure chamber 343 which surrounds the outer contour of the piston section 312, the line 362, the pressure chamber 353 and the spring space 359, so that oil can flow out of the pressure oil supply 370. The cylinder pressure chamber 332 is vented via the line 363, the pressure chamber 353 and the spring space 359, so the parking lock remains engaged.

In the second possible case when the engine starts the valve slide 310 remains against the stop 376, but erroneously, owing to pressurization of the pressure chamber 352 with the pressure of a shifting element 385 which is not the shifting element 375, the valve slide 320 is moved in opposition to the force of the spring 328 until its spring guiding pin 329 is against the stop 387. The pressure chamber is then cut off from the vented spring space 359 by the piston section 322, but as before the lines 362 and 363 are mutually connected via the pressure chamber 353 so that the cylinder pressure chamber 332 of the parking lock cylinder 303 is connected to the vented spring space 349 and the parking lock therefore remains engaged.

FIG. 3b shows the parking lock valves 301 and 302 and the parking lock cylinder 303 in the positions in which driving operation is possible. If the driver so wishes, for example if the selector lever is moved to position "D", then by pressurization of the pressure chambers 341 and 342 with a pressure-regulator pressure p_D and a shifting element pressure p_K the valve slide 310 is moved to its second position in which the spring guiding pin 319 is in contact with the stop 377. The valve slide 320 is moved by a shifting element pressure p_K2 that acts on an annular axial surface 325 to its second shift position, in which the piston section 322 cuts off the pressure chamber 353 from the vented spring space 359. Thus, there is no longer any connection between the pressure oil supply 370 and the vent 360, so the main pressure p_MP in the cylinder pressure chamber 332 can act upon the parking lock piston 331 and move it to a position B in which the parking lock is disengaged.

If now during operation a power failure occurs in the transmission control system, the pressure-regulator pressure p_D1 and the shifting element pressure p_K2 fall to at least the ambient pressure p_0. The shifting element pressure p_K1 existing in the fail-safe gear again produces via the axial surface 315 a pressure force which holds the valve slide 310 against the stop 377. The main pressure p_MP, acting via the line 362 as a self-maintaining pressure upon the axial surface 324 of the valve slide 320, holds the valve slide 320 against the stop 387, so that notwithstanding the power failure the parking lock remains disengaged and the vehicle can continue being driven.

Figure 4:
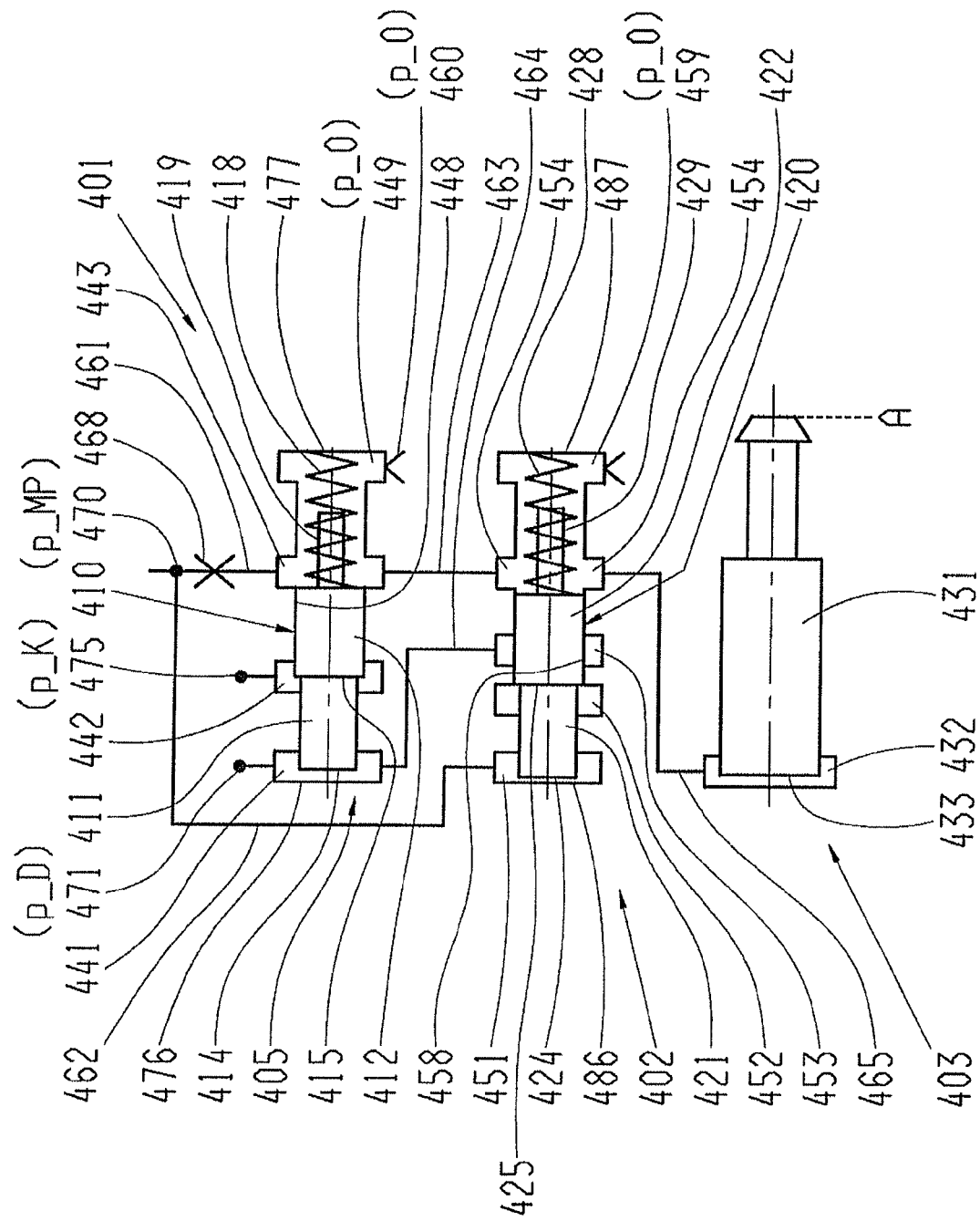
FIG. 4: A schematic representation of a third embodiment of a hydraulic shifting device according to the invention in the shift position with the parking lock engaged.

The hydraulic shifting device shown in FIG. 4 comprises two parking lock valves 401 and 402, each having a similarly designed valve slide 410 and 420 respectively, in each case with two piston sections 411 and 412 or 421 and 422 respectively. A valve bore 448 of the parking lock valve 401 stepped in accordance with the valve slide 410 extends through three pressure chambers 441, 442 and 443 and a vented spring space 449. The parking lock valve 402 also has a stepped valve bore 458 which extends through four pressure chambers 451, 452, 453 and 454 and a vented spring space 459. A pressure oil supply 470 is connected to the pressure chamber 443 of the parking lock valve 401 by way of a line 461 in which a throttle 468 is formed. In parallel, the pressure oil supply 470 is also connected by a line 462 to the pressure chamber 451 of the parking lock valve 402. The parking lock valves 401 and 402 are connected to one another by lines 463 and 464, of which the line 463 connects the pressure chamber 443 to the pressure chamber 454. A pressure regulator 471 that produces a pressure-regulator pressure p_D is connected to the pressure chamber 441 and by the line 464 to the pressure chamber 453. The pressure chamber 442 of the parking lock valve 401 is connected to a shifting element 475 which is pressurized to obtain the fail-safe gear. In the shifting element 475 there is a shifting element pressure p_K. Both the pressure-regulator pressure and the shifting element pressure can be varied.

If owing to a faulty component the valve slide 410 of the parking lock valve 401 is moved to the second shift position or if when the vehicle has stopped the valve slide 410 has erroneously remained stuck in the second shift position, then as before a cylinder pressure chamber 432 of a parking lock cylinder 403 is connected by way of a line 465 and the pressure chamber 454 to the spring space 459 and thereby vented, so that the parking lock remains engaged.

If, undesirably, the valve slide 420 of the parking lock valve 402 is in its second shift position and the valve slide 410 is in its first shift position, the cylinder pressure chamber 432 is vented by way of the line 465, the pressure chamber 454, the line 463, the pressure chamber 443 and the spring space 449, so that in this case too the parking lock remains engaged.

To drive the vehicle the parking lock has to be disengaged, which is only possible by shifting both of the valve slides 410 and 420 to the second shift position. In those positions, the spring guiding pins 419 and 429 are in contact with the respective stops 477 and 487. The piston section 412 of the valve slide 410 then cuts off the pressure chamber 443 from the vented spring space 449. In the parking lock valve 402 the piston section 422 interrupts the connection between the pressure chamber 454 and the vented spring space 459. Thus, in the hydraulic shifting device the pressure oil supply 470 is no longer connected to the vent 460 and a connection exists between the pressure oil supply 470 and the cylinder pressure chamber 432 of the parking lock cylinder 403. Accordingly the axial surface 433 can be acted upon by the main pressure p_MP and the parking lock is disengaged thereby.

If a power failure occurs in the transmission control system, the pressure-regulator pressure p_D in pressure chambers 441 and 453 falls to ambient pressure p_0. The main pressure p_MP still existing during a power failure acts as the self-maintaining pressure since, as before, it acts upon the axial surface 424 in the pressure chamber 451 and so holds the valve slide 420 in the second position. The valve slide 410 of the parking lock valve 410 is held in its second position by the shifting element pressure p_K, which is acting upon the axial surface 415 in the pressure chamber 451. Thus, even in the event of a power failure the parking lock is disengaged and the vehicle can be driven.

During normal operation of the vehicle the main pressure p_MP can adopt any values between a maximum and a minimum pressure. To prevent the valve slide 420 from being pushed back onto the stop 486 or into its first shift position when the main pressure p_MP is low, the pressure-regulator pressure p_D in the pressure chamber 441 is passed by way of the line 464 into the pressure chamber 453 of the parking lock valve 402, wherein the pressure-regulator pressure p_D acts upon the axial surface 425 of the valve slide 420 in opposition to the force of the spring 428 to hold the valve slide against the stop 487, so that the parking lock remains disengaged and the parking lock piston 431 remains in position B.

FIGS. 5a to 5d show a hydraulic shifting device that comprises two parking lock valves 501 and 502 and a parking lock cylinder 503. The parking lock valve 501 has a valve slide 510 and a spring 518, the valve slide 510 being arranged to move axially within a valve bore 548 between two stops 576 and 577. The valve slide 510 has three piston sections 511, 512 and 513 with circular cross-sections, which form sealing gaps with the valve bore 548 and thus can separate various pressure chambers from one another or connect them to one another. Between the piston sections 512 and 513 is formed a recessed section 516 within which the diameter of the valve slide 510 is smaller than the diameter of the piston sections 512 and 513. An axial surface 514 is present at the free end of the piston section 511. At the transition from the piston section 511 to the piston section 512 an annular axial surface 515 is formed. In addition, on the valve slide 510 close to the piston section 513 a cylindrical spring guiding pin 519 is formed, around which the spring 518 is arranged concentrically. The valve bore 548 extends through five pressure chambers 541 to 545 and also through a vented spring space 549, the radial extension of the pressure chambers from a central axis of the valve bore 548 being larger than the outer diameter of the piston sections.

The pressure chamber 541 is connected to a pressure regulator 571 and can therefore be pressurized with a pressure-regulator pressure p_D1. The pressure chamber 541 is connected to a shifting element 575 which is required in order to obtain a fail-safe gear if a power failure occurs in the transmission, and can therefore be acted upon with a shifting element pressure p_K1. The pressure chamber 543 is vented, i.e. connected to a vent 560. The pressure chamber 544 is on the one hand connected by a branched line 562 both to a cylinder pressure chamber 532 of the parking lock cylinder 503 and also to a connection point 535. On the other hand the pressure chamber 544 is connected by the recessed section 516 to the vented pressure chamber 543 and is therefore itself vented. The pressure chamber 545 is connected to the pressure oil supply 570, so it can be acted upon by the main pressure p_MP. Between the pressure oil supply 570 and the pressure chamber 545 is arranged a hydraulic resistance, in this example a throttle 568.

The parking lock valve 502 comprises a valve slide 520 on which is formed a cylindrical spring guiding pin 529. Concentrically around the spring guiding pin 529 is arranged a spring 528 which, when the drive motor is stopped or the hydraulic system is unpressurized, pre-stresses the valve slide 520 with an axial surface 524 against a stop 586. The valve slide 520 is arranged to move axially in a valve bore 558 between two stops 586 and 587, and has a piston section 521 of circular cross-section which forms a sealing gap with the valve bore 558. The valve bore 558 extends through two pressure chambers 551 and 552, and through a vented spring space 559. The pressure chamber 551 is connected to a pressure regulator 581 or to a shifting element 585, so that in the pressure chamber 551a shifting element pressure p_K2 or a pressure-regulator pressure p_D2 can act upon the axial surface 524. By way of a line 563 the pressure chamber 552 is connected to a pressure connection point 536 of the parking lock cylinder 503.

The parking lock cylinder 503 has a parking lock piston 531 which is guided to move axially within a cylinder bore 537 between two positions A and B. In the illustrated position of the parking lock piston 531, which can be acted upon by pressure via a cylinder pressure chamber 532, the free end of the piston is at a position A in which the parking lock is engaged. The parking lock piston 531 has a recessed section referred to as a control groove 534. In position A the pressure connections 535 and 536 are in the same axial position relative to a longitudinal axis of the parking lock 531 as is the control groove 534 in position A of the parking lock piston 531, so that the pressure connections 535 and 536 are connected to one another via the control groove 534. If the parking lock piston 531 and hence the control groove 534 is not in the same axial position as the pressure connections 535 and 536, i.e. not in position A, then the connections are separated from one another by the parking lock piston 531 as shown in FIG. 5d. The pressure connections 535 and 536 are formed in the same housing as is the cylinder bore 537, for example in a control system housing 505.

Figure 5A:
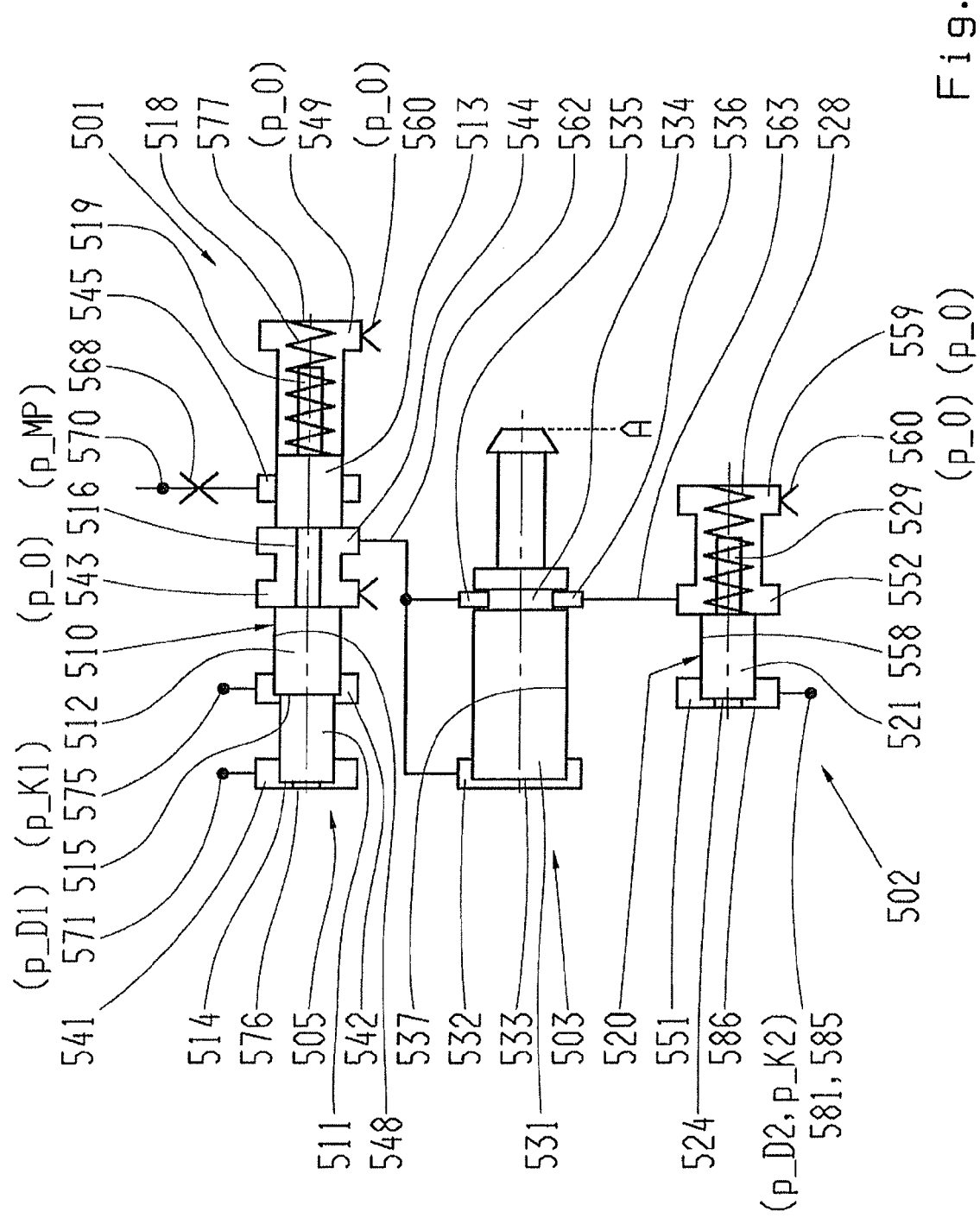
FIG. 5a: A schematic representation of a fourth embodiment of a hydraulic shifting device according to the invention in the shift position with the parking lock engaged.

Before the drive engine of the vehicle and hence the drive to the transmission pump have been started, the entire hydraulic system is unpressurized and with the selector lever in position "P" the valve slides 510 and 520 and the parking lock piston 531 are in the positions shown in FIG. 5a, so the parking lock is engaged. The position of the valve slides shown, namely in contact with the stops 576 and 586 respectively, is also referred to as the "first position". In this first position the piston section 513 blocks the inflow from the pressure oil supply 570. The cylinder pressure chamber 532 of the parking lock cylinder 503 is vented via the line 562 and the pressure chambers 544 and 543, so the parking lock piston is in position A and the parking lock is therefore engaged. If now the drive engine is started a main pressure p_MP is built up, which cannot however flow away to the vent, so that hydraulic losses are advantageously avoided.

If now, with the drive engine running, a fault results in an undesired pressure build-up of a pressure-regulator pressure p_D in pressure chamber 541 or of a shifting element pressure p_K in pressure chamber 542, their action on the axial surfaces 514 or 515 respectively exerts an axial force on the valve slide 510. Because of this the valve slide is undesirably pushed in opposition to the force of the spring 518 to the second position in which the spring guiding pin 519 is in contact with the stop 577, as shown in FIG. 5c. The piston section 513 now no longer blocks the pressure oil supply 570 and the pressure chamber 545 is connected by way of the recessed section 516 to the pressure chamber 544. Accordingly, the oil can pass through the line 562 into the cylinder pressure chamber 532 and through the pressure connection 535, the control groove 534, the pressure connection 536, the line 563, the pressure chamber 552 and the spring space 559, to the vent 560. Thus the cylinder pressure chamber 532 too is also connected to the vent 560, so that it is unpressurized or at the ambient pressure p_0, and the parking lock piston 531 remains in position A, i.e. the parking lock remains engaged.

If, due to a fault in a pressure regulator 581 or in a shifting element 585, the pressure chamber 551 of the parking lock valve 502 is erroneously pressurized with a pressure, the valve slide 520 switches to its second position as shown in FIG. 5b and cuts off the pressure chamber 552 from the vented spring space 559. But since the valve slide 510 is still in its first position the cylinder pressure chamber 532 is as before vented by way of the line 562, the pressure chamber 544 and the pressure chamber 543, so that even if there is a fault in the pressure regulator 581 or the shifting element 585 the parking lock remains engaged.

If now the selector lever is moved to the position "N", "R" or "D" so that the parking lock is disengaged, the pressure-regulator pressure p_D1 that acts in the pressure chamber 541 is increased by the pressure regulator 571. By the action of the pressure-regulator pressure p_D1 on the axial surface 514 an axial force is exerted on the valve slide 510 and it is moved in opposition to the force of the spring 518 to its second position in which the spring guiding pin 519 is in contact with the stop 577. The operating medium can now flow out of the pressure oil supply 570, through the pressure chambers 545 and 544 and the line 562, to the cylinder pressure chamber 532. However, a pressurization of the pressure chamber 532 by the main pressure p_MP required for disengaging the parking lock or moving the parking lock piston 531, can now not yet take place because of the parallel connection of the pressure oil supply 570 to the vented spring space 559.

For that reason, at the same time as or even before the shifting of the valve slide 510 to its second position, in the parking lock valve 502 by pressurizing the pressure chamber 551 with the pressure-regulator pressure p_D2 or the shifting element pressure p_K2, when a particular pressure threshold is exceeded the valve slide 520 is moved from its first to its second position against the force of the spring 528.

In the second shift position, in which the spring guiding pin 529 is against the stop 587, the piston section 521 blocks the line 563 to the vented spring space 559 as shown in FIGS. 5b and 5d. Thereafter the main pressure p_MP can build up in the cylinder pressure chamber 532 and move the parking lock piston 531 out of position A to position B, whereby the parking lock is disengaged and the vehicle can be moved. With this displacement of the parking lock piston 531 to position B the control groove 534 is also moved relative to the pressure connections 535 and 536, which have now been blocked by the parking lock piston 531 and separated from one another. Thus the parking lock valve 502 is cut off from the rest of the hydraulic shifting device and has no effect regardless of its shift position.

If now, while driving with the selector lever in position "D", a power failure occurs in the transmission control system, the pressure-regulator pressure p_D1 in the pressure chamber 541 can fall to ambient pressure. But since, as also in the previous embodiments, the shifting element pressure p_K2 is present in the pressure chamber 542 even in the absence of power and acts upon the axial surface 515 therein, it acts as a self-maintaining pressure so that the valve slide 510 remains in its second shift position and the parking lock is therefore still disengaged. In contrast to the previous systems the parking lock valve 502 needs no self-maintaining pressure, since as described above it has no function when the parking lock is disengaged. If the shifting element 585 is provided as a control pressure source, it does not therefore necessarily have to be closed in order to obtain a fail-safe gear ratio. Advantageously, the valve slide 520 can be of simple design and short, since it need not have a second axial surface to be acted upon by a self-maintaining pressure.

Figure 6:
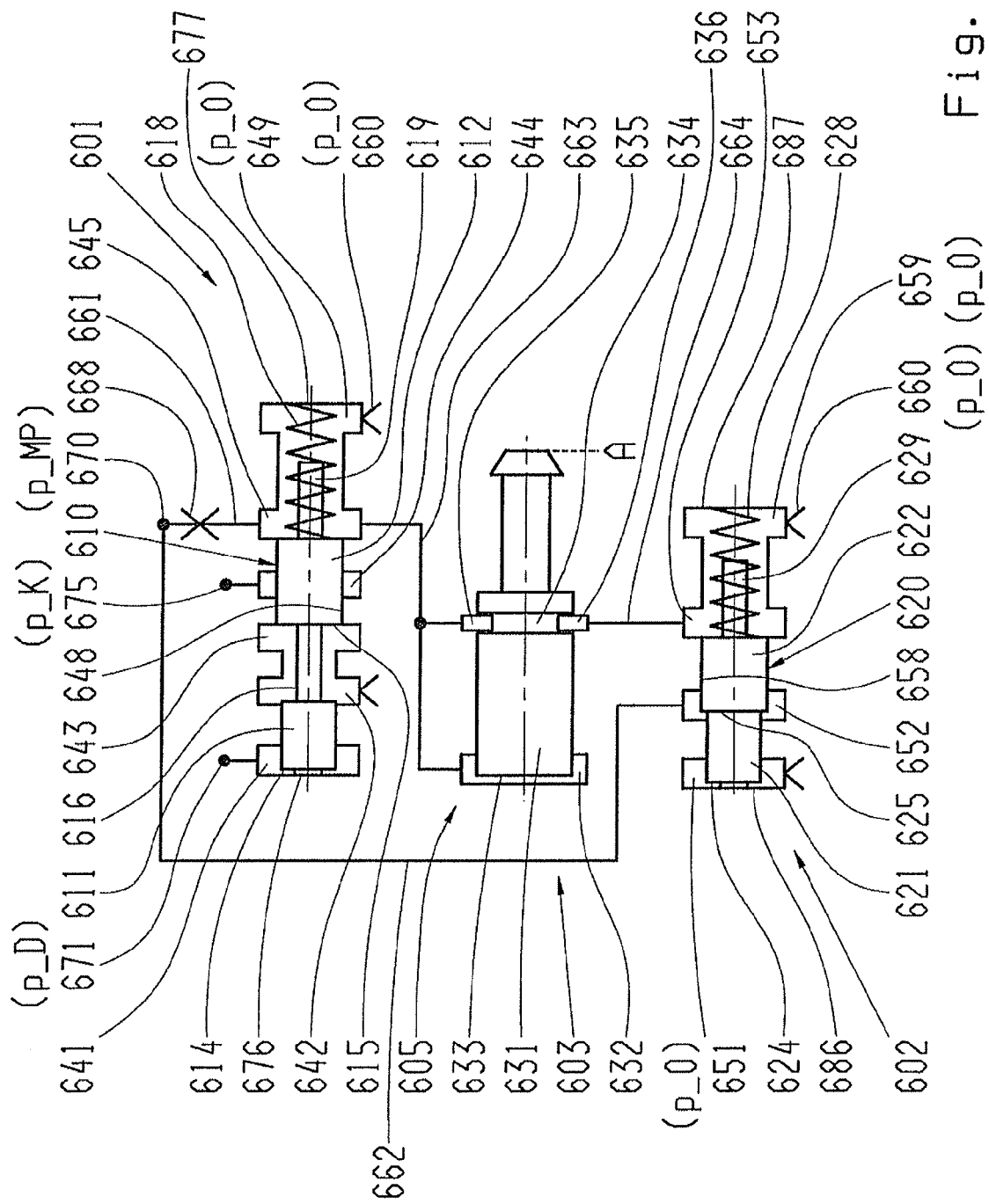
FIG. 6: A schematic representation of a fifth embodiment of a hydraulic shifting device according to the invention in the shift position with the parking lock engaged.

FIG. 6 shows a hydraulic control device which comprises two parking lock valves 601 and 602 that can each be switched to two shift positions, as well as a parking lock cylinder 603. The parking lock cylinder 603 has the same structure as the parking lock cylinder 503 in FIG. 5.

In the engaged condition of the parking lock, as for example in the selector lever position "P", the two valve slides 610 and 620 are pre-stressed by the force of respectively associated springs 618 and 628 in their first shift position in contact with respective stops 676 and 686. In this case a pressure oil supply 670 is connected via a line 661 in which a diaphragm orifice 668 is formed and a pressure chamber 645, to a vented spring space 649, so that downstream from the diaphragm orifice 668 no pressure can build up. A cylinder pressure chamber 632 is also connected by a line 663 to the pressure chamber 645 and thus, when the valve slide 610 is in this first position, it is also connected to the vented spring space 649, so that a parking lock piston 631 adopts the position A in which the parking lock is engaged. In the position A there is also a connection between the pressure chamber 645 and a pressure chamber 653 of the parking lock valve 602 which is vented in this shift position of the valve slides 610 and 620, and this by way of the line 663, a pressure connection 635 on the parking lock cylinder 603, a control groove 634, a pressure connection 636 and a line 664. Thus, the cylinder pressure chamber 632 of the parking lock cylinder 603 is also connected to the two vented spring spaces 649 and 659, and is accordingly itself vented. Apart from being connected to the parking lock valve 601, the pressure oil supply 670 is also connected directly by a line 662 to a pressure chamber 652 of the parking lock valve 602, in which the main pressure p_MP can act upon an annular axial surface 625.

In the first shift position of the valve slide 610, as shown, it is possible for a pressure p_K to be present at the shifting element 675 or in the pressure chamber 644, which pressure is high enough for a leakage stream of the operating medium to flow through a gap between the piston section 612 and the valve bore 648, into the pressure chambers 643 and 645. In the shift position illustrated the pressure chamber 645 is vented both by way of the spring space 649 and through the lines 663 and 664 and the pressure chamber 653 and the spring space 659 of the parking lock valve 602. So that in the pressure chamber 643 no pressure can build up, which via the axial surface 615 exerts a force on the valve slide 610 and moves it undesirably to the second shift position, the vented pressure chamber 642 is provided, which in the first shift position is connected by the recessed section 616 to the pressure chamber 643.

If, after the drive engine has been directly or remotely started, the main pressure p_MP erroneously exceeds a certain threshold value, then the level of the main pressure p_MP is sufficient to move the valve slide 620 in opposition to the force of the spring 628 to the second shift position, in which a spring guiding pin 629 formed on the valve slide 620 encounters a stop 687. In that shift position a piston section 622 of the valve slide 602 interrupts the connection of the pressure chamber 632 to the vented spring space 659. However, since the cylinder pressure chamber 632 is still vented by way of the line 663 and the pressure chamber 645 as well as the spring space 649, the parking lock piston 631 remains in position A and the parking lock is therefore engaged, so a single fault in the transmission control system does not lead to rolling away of the vehicle.

If an unwanted energization of a pressure regulator 671 occurs, by virtue of which the pressure-regulator pressure p_D is raised sufficiently for the valve slide 610 to be moved to its second shift position, the piston section 612 blocks the connection from the pressure oil supply 670 to the vented spring space 649. Because of this the main pressure p_MP could act within the cylinder pressure chamber 632 if the latter were not vented by the parking lock valve 602, or via the line 663, the pressure connection 635, the control groove 634, the pressure connection 636, the pressure chamber 653 and the spring space 659. Thus, even if there is a single fault in the parking lock valve 601 the parking lock piston 631 remains in position A and the parking lock therefore remains engaged.

During driving operation, i.e. with the selector lever in position "D", "N" or "R", the parking lock must be disengaged, i.e. the respective valve slides 610 and 620 of the two parking lock valves 601 and 602 must each be in their second shift position, in contact with the stops 677 or 687 respectively. The valve slide 610 is moved, by pressurizing the pressure chamber 641 with a pressure-regulator pressure p_D higher than a certain necessary threshold value, to its second shift position in which the piston section 612 cuts off the connection between the pressure chamber 645 and the vented spring space 649, and in which the pressure oil supply 670 is connected to the cylinder pressure chamber 632 via the pressure chamber 645 and the line 663. In addition, in a recessed section 616 of the valve slide 610 or in a pressure chamber 644 a shifting element pressure p_K acts upon an axial surface 615, producing a pressure force which additionally holds the valve slide 610 in its second shift position. In the parking lock valve 602 the valve slide 620 is moved to its second position against the stop 687, since the main pressure p_MP is raised above a certain threshold value. In this second shift position of the valve slide 620 the piston section 622 blocks the connection of the pressure chamber 632 to the vented spring space 659. Thus, in the cylinder pressure chamber 632 the main pressure p_MP can build up and move the parking lock piston 631 to position B, in which the parking lock is disengaged and the vehicle can be moved.

In position B the parking lock piston 631 cuts off the parking lock valve 602 from the rest of the hydraulic shifting device as described with reference to FIG. 5d, so the shift position of the valve slide 620 has no effect on the operating behavior. If during driving operation, as for example with the selector lever in position "D", a power failure occurs in the transmission control system, then a pressure-regulator 671 that pressurizes the pressure chamber 641 is no longer actuated and the pressure-regulator pressure p_D falls to the ambient pressure p_0, so that no pressure force is any longer exerted on the axial surface 614. But since the shifting element 675 is pressurized even during a power failure because it has to be closed in order to obtain a fail-safe gear, the shifting element pressure p_K still acts upon the axial surface 615 to produce a force on the valve slide 610 in the direction toward the stop 677, and thus acts as a self-maintaining pressure. Consequently position B of the parking lock piston 631 is still maintained and the parking lock is therefore disengaged so that driving can continue.

Figure 7:
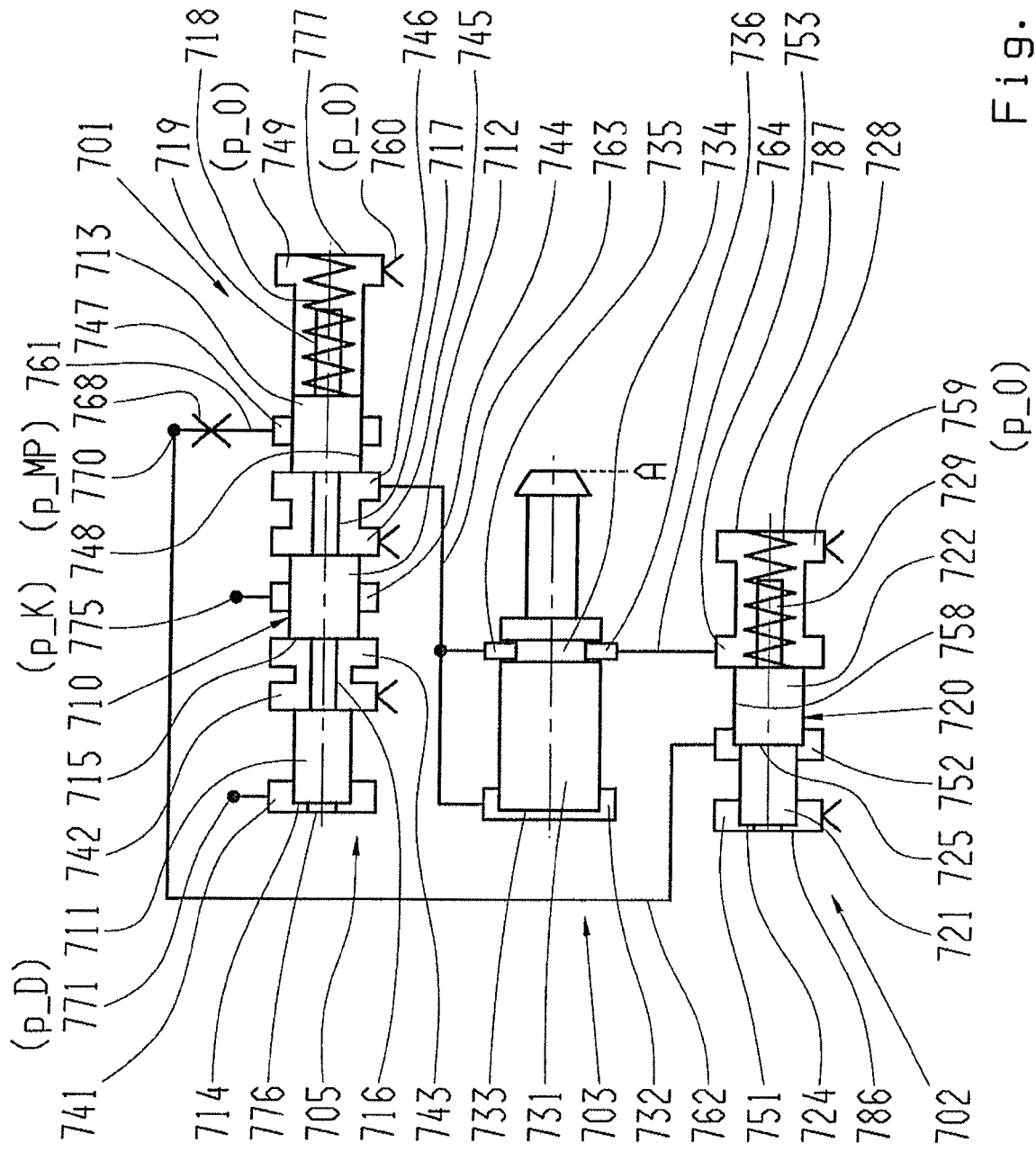
FIG. 7: A schematic representation of a sixth embodiment of a hydraulic shifting device according to the invention in the shift position with the parking lock engaged.

As a difference from the hydraulic shifting device in FIG. 6, the hydraulic shifting device represented schematically in FIG. 7 comprises another parking lock valve 701. The arrangement, interconnection and design of the parking lock cylinder 703 and the parking lock valve 702 are identical to those of the shifting device in FIG. 6, as also is the direct connection of the parking lock valve 702 to a pressure oil supply 770. The parking lock valves 701 and 702, or their two associated valve slides 710 and 720, are shown in a first shift position which is adopted, for example, when the drive engine is stopped.

The parking lock valve 701 comprises the valve slide 710 and a spring 718. The valve slide 710 is arranged to move axially in a valve bore 748 between two stops 776 and 777, into two shift positions. In accordance with the diameters of piston sections 711, 712 and 713, the valve bore is stepped and extends through seven pressure chambers 741 to 747 and a vented spring space 749. Between the piston sections 711 and 712 a recessed section 716 is formed in the valve slide 710, with another recessed section 717 also between the piston sections 712 and 713. The pressure chamber 741 is connected to a pressure regulator 771 and can therefore be acted upon by a pressure-regulator pressure p_D. The pressure chambers 742 and 745 and the spring space 749 are vented. The pressure chamber 744 is connected to a shifting element 775, which in order to obtain a fail-safe gear if the power fails, is acted upon by a shifting element pressure p_K.

In the first shift position of the valve slide 710 shown, a pressure p_K can be present in the shifting element 775 and in the pressure chamber 744, which is high enough for a leakage stream of the operating medium to flow through a gap between the piston section 712 and the valve bore 748 to the pressure chambers 743 and 745. The pressure chamber 745 is vented. So that no pressure can build up in the pressure chamber 743 which, via the axial surface 715, would exert a force on the valve slide 710 and undesirably move it to the second shift position, the vented pressure chamber 742 is provided, which in the first shift position is connected to the pressure chamber 743 by way of the recessed section 716.

FIG. 7 shows the valve slides 710 and 720 in a first shift position, which they both adopt even when the drive engine has stopped or in selector lever position "P" when all functions are correct. The spring 718 pre-stresses the valve slide 710 against a stop 776. The piston section 713 cuts off the pressure oil supply 770 both from a vented spring space 749 and from the cylinder pressure chamber 732 of the parking lock cylinder 703 and from the vented pressure chamber 745. Advantageously thereby, when the engine is running while the selector lever is in position "P" an operating medium previously pressurized with expenditure of energy can drain away to the vent.

If now, when the drive engine is started directly or by a remote starting device, owing to an electrical fault in the transmission control system the pressure regulator 771 is actuated and the axial surface 714 of the valve slide 710 in the pressure chamber 741 is acted upon by pressure, the valve slide 710 is moved in opposition to the force of the spring to the second shift position. In this second shift position the valve slide 710, i.e. its spring guiding pin 719, is in contact with a stop 777. In the second shift position the pressure oil supply 770 is connected by way of the pressure chamber 747, the recessed section 717, the pressure chamber 746 and the line 763 to a cylinder pressure chamber 732 and could pressurize the latter with a main pressure p_MP. However, the cylinder pressure chamber 732 is vented by way of the line 763, a pressure connection 735, a control groove 734, a connection 736, a line 764, a pressure chamber 753 and a spring space 759, so that even if there is a faulty function in the parking lock valve 701 the parking lock remains engaged.

If a fault occurs in the parking lock valve 702, due to which by analogy with the example illustrated in FIG. 6 the valve slide 720 is moved to its second shift position and the connection from the cylinder pressure chamber 732 to the vented spring space 759 is interrupted, the valve slide 710 will still be in its first shift position.

In the first shift position of the valve slide 710 the cylinder pressure chamber 732 is vented via the line 763, the pressure chamber 746, the recessed section 717 and the vented pressure chamber 745, so no pressure can build up in the cylinder pressure chamber 732. Furthermore there is no possibility of an inflow of operating medium that could fill or pressurize the cylinder pressure chamber 732, since in the first shift position the piston section 713 cuts off the pressure oil supply 770 from the cylinder pressure chamber 732. Thus, the parking lock piston 731 remains in position A and the parking lock is engaged.

When the selector lever positions "D", "N" or "R" are engaged, by pressurization of the pressure chamber 732 the parking lock piston 731 should be moved to a position B in which the parking lock is disengaged. For this the valve slides 710 and 720 have to be switched to the second shift position, which—as in the example of the shifting device in FIG. 6—takes place by pressurization of a pressure chamber 752, by way of a line 762, with the main pressure p_MP and pressurization of the pressure chamber 741 with the pressure-regulator pressure p_D. In position B the parking lock piston 731 cuts off the parking lock valve 702 from the rest of the shifting device, as in the shifting device of FIG. 6. In the second shift position of the valve slide 710 the shifting element pressure p_K, which exists even during a power failure, now acts in the pressure chamber 744 to exert an additional pressure force on the valve slide 710, directed toward the stop 777.

During driving with the selector lever in position "D", if a power failure occurs in the transmission control system the pressure-regulator pressure p_D in the pressure chamber 741 of the parking lock valve 701 decreases, so the pressure force introduced via the axial surface 714 is unnecessary. In the pressure chamber 744 the shifting element pressure p_K still acts on the axial surface 715 and so holds the valve slide 710 in its second shift position. Thus, the cylinder pressure chamber 732 is still pressurized with the main pressure p_MP and the parking lock therefore remains disengaged.

Figure 8:
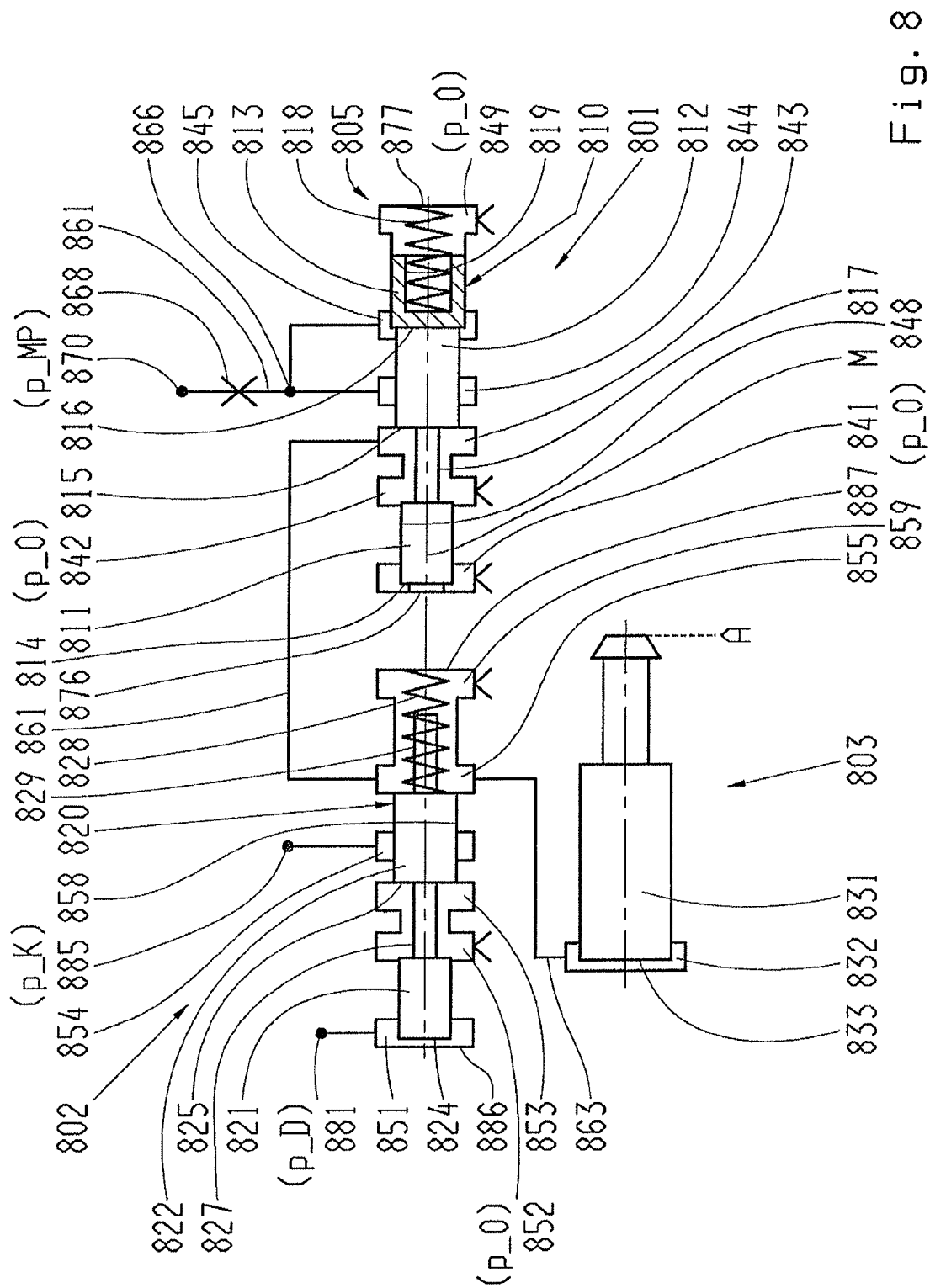
FIG. 8: A schematic representation of a seventh embodiment of a hydraulic shifting device according to the invention in the shift position with the parking lock engaged.

FIG. 8 shows a further embodiment of a hydraulic shifting device for controlling a parking lock. In this case, as regards the connection between a pressure oil supply 807 and a parking lock cylinder 803 two parking lock valves 801 and 802 are arranged in series. In addition the hydraulic shifting device comprises a parking lock cylinder 803, which is designed in the same way as the parking lock cylinders 103, 203, 303 and 403 in FIGS. 1 to 4.

The parking lock valve 801 has a valve slide 810 and a spring 818. The valve slide 810 is arranged to move axially in a valve bore 808 between two stops 876 and 877, and has three cylindrical piston sections 811, 812 and 813. A recessed section 817 is formed between the piston sections 811 and 812. The diameter of the piston section 811 is smaller than that of the piston section 812, whose diameter in turn is smaller than that of the piston section 813. At its free end a spring guiding bore 819 is formed in the piston section 813, in which a spring 818 is fitted and guided. The piston section 811 is the part of the valve slide 810 that faces toward the stop 876. At the transition from the piston section 812 to the immediately adjacent piston section 813 an annular axial surface 816 is formed, which can be acted upon in the pressure chamber 845 by a throttled main pressure p_MP.

By virtue of the different diameters of the piston sections 811 and 812, on the side of the piston section 812 facing toward the recessed section 817 there is an annular axial surface 815, formed by the difference between the circular areas determined by the respective diameters of the piston sections 812 and 811. The circular area derived from the diameter of the piston section 811 forms an axial surface 814.

The valve bore is for example formed in a control housing 805 and extends through five pressure chambers 841 to 845 and a vented spring space 849. The pressure chambers 841 and 842 are also vented. As in the previous example embodiments the valve bore 848 is formed as a stepped bore in accordance with the diameters of the various piston sections.

A pressure oil supply 870 is connected in parallel via a line 861 and a branching point 866 to the pressure chambers 844 and 845. Between the pressure oil supply 870 and the branching point 866 is formed a diaphragm orifice 868, which in the event of a pressure fall in the hydraulic shifting device, is designed to prevent a pressure collapse in the remainder of the hydraulic transmission control system.

The parking lock valve 802 comprises a valve slide 820 and a spring 828, such that the valve slide 820 can move axially in a valve bore 858 between two stops 886 and 887. At one end the valve slide 820 has a piston section 821 and at the other end a spring guiding pin 829. Next to the spring guiding pin 829 is formed a piston section 822 whose diameter is larger than both that of the spring guiding pin 829 and that of the piston section 821. Between the piston sections 821 and 822 is formed a recessed section 827, within which the diameter of the valve slide 820 is smaller than those of the piston sections 821 and 822. In accordance with the different diameters of the piston section 821 and 822 the valve bore 848 is made as a stepped bore and it extends through five pressure chambers 851 to 855 and a spring space 859. The pressure chamber 852 and the spring space 859 are vented. The pressure chamber 851 is connected to a pressure regulator 881 and can be pressurized with a pressure-regulator pressure p_D. The pressure chamber 854 is connected to a shifting element 885 which, if a power failure occurs in the transmission control system while the selector lever is in position "D", is closed by the action of the pressure to obtain a fail-safe gear in which driving on is still possible. In the shifting element 885 a shifting element pressure p_K is present.

In the first shift position of the valve slide 820 shown a pressure p_K can be present in the shifting element 885 and in the pressure chamber 854, which is high enough for a leakage stream of the operating medium to flow through a gap between the piston section 822 and the valve bore 858 into the pressure chambers 853 and 855. In the shift position shown the pressure chamber 855 is vented both via the spring space 859 and also by way of the line 861, the pressure chamber 843 and the vented pressure chamber 842 of the parking lock valve 801. To prevent a build-up of pressure in the pressure chamber 853, which via the axial surface 825 would exert a force on the valve slide 820 and move it to the second shift position when not desired, the vented pressure chamber 852 is provided, which in the first shift position is connected to the pressure chamber 853 by way of the recessed sections 827.

The pressure chamber 843 of the parking lock valve 810 is connected by a line 862 to the pressure chamber 855 of the parking lock valve 802. Apart from that, the pressure chamber 855 is connected by a line 863 to a cylinder pressure chamber 832 of the parking lock cylinder 803.

The schematic representation in FIG. 8 shows the parking lock valves 801 and 802 or their valve slides 810 and 820 in shift positions in which a parking lock piston 831 of the parking lock cylinder 803 is in position A and is therefore engaged and cannot be disengaged. These shift positions are adopted for example when the drive engine is stopped or in the selector lever position "P", when there is no fault in the transmission control system or in the pressure adjustment elements. Now if when the drive engine is started directly or remotely the main pressure p_MP increases erroneously, this acts upon the pressure chamber 845 and hence the axial surface 816. In this embodiment of the hydraulic shifting device an outflow of the operating medium directly to the vent and into the transmission sump during fault-free operation is advantageously not possible. If a certain threshold value of the main pressure p_MP is exceeded, the valve slide 810 is moved in opposition to the force of the spring 818 to its second shift position, in which the piston section 813 is in contact with the stop 877. In this shift position the pressure oil supply 870 is connected via the line 861, the pressure chamber 844, the recessed section 817, the pressure chamber 843, the line 862 and the pressure chamber 855 to the vented spring space 859, so no pressure can build up after the diaphragm orifice. The cylinder pressure chamber 832 as well is connected to the vent in the spring chamber 859 via a line 863 and the pressure chamber 855. Thus, the parking lock piston 831 remains in position and the parking lock is engaged.

If the fault during starting occurs in a pressure regulator that acts on the parking lock valve 802, whereby the pressure-regulator pressure p_D in the pressure chamber 851 increases, the valve slide 820 is moved in opposition to the force of the spring 828 to a second shift position, in which its spring guiding pin 829 is in contact with the stop 887. In this position the piston section 822 cuts off the pressure chamber 855 from the vented spring space 859. The cylinder pressure chamber 832 of the parking lock cylinder 803, however, is still connected to the vented pressure chamber 842 by way of the line 863, the pressure chamber 855 that encloses the piston section 822, the line 862 and the pressure chamber 843, so that the cylinder pressure chamber 832 as well is vented. Since the valve slide 801 is in its first shift position against the stop 876, the connection between the pressure chamber 832 and the pressure oil supply is also interrupted. Thus, even if a single fault occurs in the parking lock valve 802 the parking lock remains engaged.

Only when the valve slides 810 and 820 of both parking lock valves 801 and 802 are in the second position against the stops 877 and 887 respectively, can an actuating pressure, in this case the main pressure p_MP, build up in the cylinder pressure chamber 832 so that the parking lock can be disengaged. As already described for the previous figures, this is necessary when moving the selector lever to positions "N", "R" or "D".

Having regard to the force of the spring 818 the size of the axial surfaces 815 and 816 is chosen such that even with a minimal main pressure p_MP the valve slide 810 can be held against the stop 877 in opposition to the force of the spring 818, so that the parking lock remains disengaged.

If, in selector lever position "D", a power failure occurs in the transmission control system, then a maximum main pressure value is produced which acts as a self-maintaining pressure upon the axial surfaces 815 and 816 and thus holds the valve slide 810 in its second shift position. After a power failure, in the parking lock valve 802 the shifting element pressure p_K required for obtaining the fail-safe gear is still present in the pressure chamber 854 and this holds the valve slide 820 in the second shift position. Thus, both valve slides 801 and 802 are in the second position, whereby the parking lock is disengaged and driving can continue.

The schematic representation of the hydraulic shifting device in FIG. 8 shows that the two parking lock valves 801 and 802 are arranged coaxially, i.e. the valve bores 848 and 858 of the two parking lock valves 801 and 802 have a common central axis M. The parking lock valves 801 and 802 are arranged on the central axis M one behind the other, so that in an advantageously space-saving manner they can be accommodated in a control housing 805. This arrangement is made easier by the fact that to connect the two parking lock valves 801 and 802 only one line 862 is needed between them. In principle a coaxial arrangement is possible with all of the embodiments shown.

Figure 9:
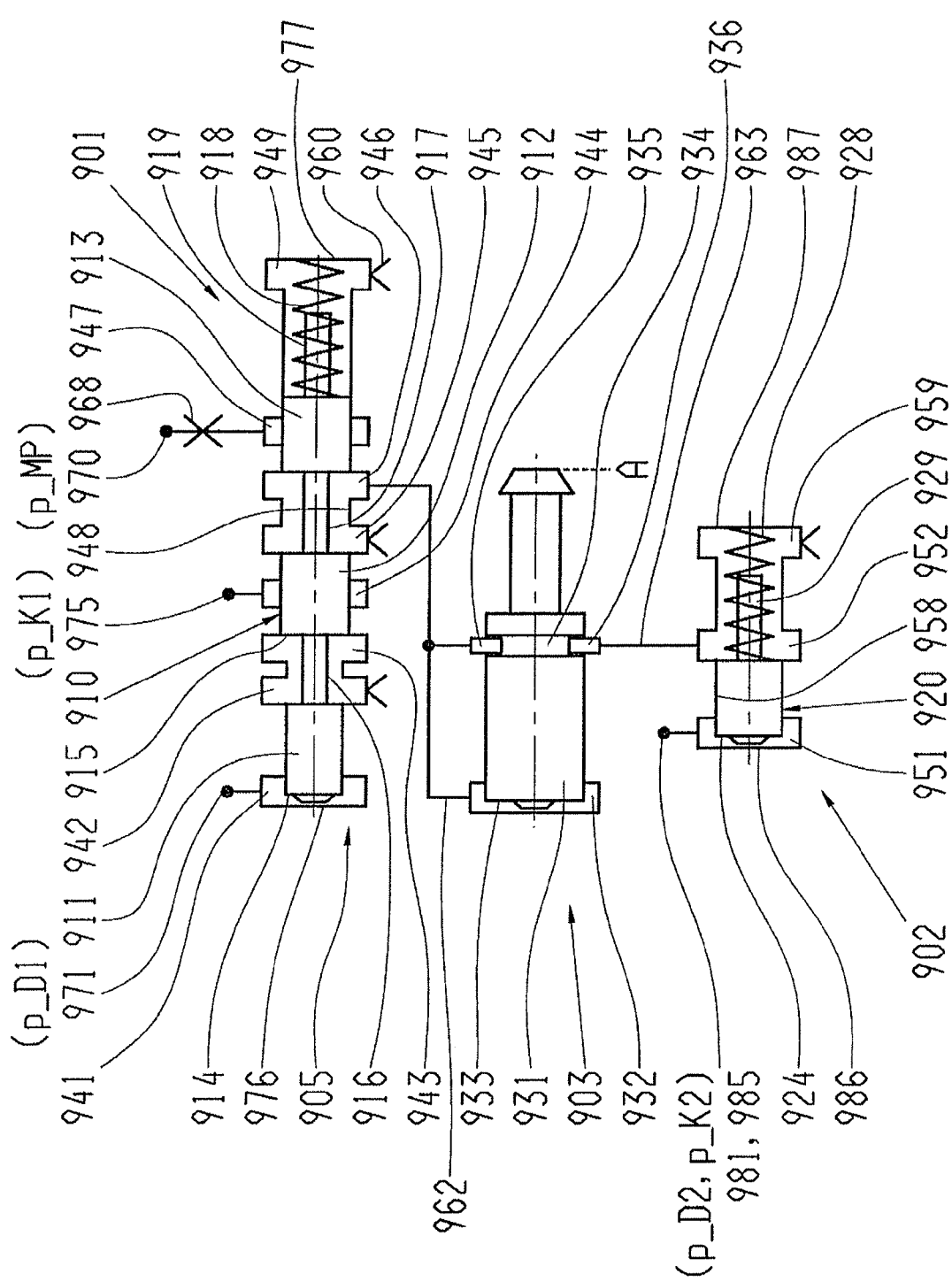
FIG. 9: A schematic representation of an eighth embodiment of a hydraulic shifting device according to the invention in the shift position with the parking lock engaged.

FIG. 9 shows a hydraulic shifting device for controlling a parking lock in an automatic transmission. The hydraulic shifting device comprises two parking lock valves 901 and 902, and a parking lock cylinder 903.

The parking lock valve 901 comprises a valve slide 910 and a spring 918. The valve slide 910 is arranged to move axially in a valve bore 948 between two stops 976 and 977, namely into two shift positions. The valve bore 948 is stepped in accordance with the diameter of piston sections 911, 912 and 913, and extends through seven pressure chambers 941 to 947 and a vented spring space 949. In the valve slide 910 recessed sections 916 and 917 are formed, respectively between the piston sections 911 and 912 and between the piston sections 912 and 913. The pressure chamber 941 is connected to a pressure regulator 971 and can therefore be pressurized with a pressure-regulator pressure p_D1. The pressure chambers 942 and 945 and the spring space 949 are vented. The pressure chamber 944 is connected to a shifting element 975 which can be acted upon by a shifting element pressure p_K1 to obtain a fail-safe gear in the event of a power failure.

In the first shift position of the valve slide 910 shown, a pressure p_K1 can be present at the shifting element 975 and in the pressure chamber 944, which can be high enough for a leakage stream of the operating medium to flow though a gap between the piston section 912 and the valve bore 948 into the pressure chambers 943 and 945. The pressure chamber 945 is vented. To prevent a build-up of pressure in the pressure chamber 943 which, via the axial surface 915, could exert a force on the valve slide 910 and undesirably move it to its second position, the vented pressure chamber 942 is provided, which in the first shift position is connected to the pressure chamber 943 by the recessed section 916.

The parking lock valve 902 comprises a valve slide 920 on which is formed a cylindrical spring guiding pin 929. Arranged concentrically around the spring guiding pin 929 is a spring 928 which, when the drive engine is stopped, pre-stresses the valve slide 920 with an axial surface 924 against a stop 986. The valve slide 920 is arranged to move axially in a valve bore 958 between two stops 986 and 987, and has a piston section 921 with a circular cross-section which forms a sealing gap with the valve bore 958. The valve bore 958 extends through two pressure chambers 951 and 952 and a vented spring space 959. The pressure chamber 951 is connected either to a pressure regulator 981 or to a shifting element 985. The pressure chamber 952 is connected by a line 963 to a pressure connection 936 of the parking lock cylinder 903.

The parking lock cylinder 903 has a parking lock piston 931 which is guided to move axially within a cylinder bore between two positions A and B. In the illustrated position of the parking lock piston 931 which can be acted upon by pressure via a cylinder pressure chamber 932, its free end is in a position A in which the parking lock is engaged. The parking lock piston 931 has a recessed section referred to as a control groove 934. In position A the pressure connections 935 and 936 are in the same axial position relative to a longitudinal axis of the parking lock piston 931 as is the control groove 934 in position A of the parking lock piston 931, so that the pressure connections 935 and 936 are connected to one another by the control groove 934. If the parking lock piston 931 and hence the control groove 934 is not in the same axial position as the pressure connections 935 and 936, i.e. not in position A, the connections are cut off from one another by the parking lock piston 931. The pressure connections 935 and 926 are formed in the same housing as is the cylinder bore 937, for example in a control housing 905.

FIG. 9 shows the valve slides 910 and 920 in a first shift position which, even when the drive engine is stopped or the selector lever is in position "P", they both adopt when all functions are correct. The spring 918 pre-stresses the valve slide 910 against a stop 976. The piston section 913 cuts off the pressure oil supply 970 both from a vent 960 via the spring space 949 and also from the cylinder pressure chamber 932 of the parking lock cylinder 903, and from the vented pressure chamber 945. Advantageously, because of this, when the engine is running and the selector lever is in position "P" no operating medium previously pressurized with some expenditure of energy can flow away to the vent.

If now, when the drive engine is started directly or remotely, due to an electrical fault in the transmission control system, the pressure regulator 971 is actuated so that the axial surface 914 of the valve slide 910 is acted upon by pressure in the pressure chamber 941, then the valve slide 910 is moved in opposition to the force of the spring 918 to a second shift position. In this second shift position the valve slide 910 or its spring guiding pin 919 is in contact with a stop 977. In the second shift position the pressure oil supply 970 is connected by way of the pressure chamber 947, the recessed section 917, the pressure chamber 946 and the line 962 to the cylinder pressure chamber 932 and could pressurize the latter with a main pressure p_MP. However, the cylinder pressure chamber 932 is vented via the line 962, the pressure connection 935, the control groove 934, the pressure connection 936, a line 963, a pressure chamber 952 and a spring space 959, so that even if there is a faulty function in the parking lock valve 901 the parking lock remains engaged.

If, owing to a fault in the pressure regulator 981 or in a pressure regulator that acts upon the shifting element 985, the pressure chamber 951 of the parking lock valve 902 is erroneously pressurized with a pressure-regulator pressure p_D1 or a shifting element pressure p_K2, then the parking lock valve 902 moves to its second position. But since the valve slide 910 is still in its first position, the cylinder pressure chamber 932 is as before vented via the line 962, the pressure chamber 946 and the pressure chamber 945, so that even in the event of a fault in the pressure regulator 981 or the shifting element 985 the parking lock remains engaged.

When the selector lever positions "D", "N" or "R" are selected, the parking lock piston should be moved, by pressurization of the pressure chamber 932, away from position A and into a position B (not shown) in which the parking lock is disengaged. For this the valve slides 910 and 920 both have to be moved to their second shift positions, which takes place by pressurization of the pressure chamber 951 with pressure from a pressure regulator 981 or pressure from a shifting element 985, and pressurization of the pressure chamber 941 with the pressure-regulator pressure p_D1 from the pressure regulator 971. In the disengaging position the parking lock piston 931 cuts off the parking lock valve 902 from the rest of the shifting device, as in the case of the shifting device of FIG. 5. Advantageously, as in FIG. 5 the valve slide 920 can be made simple and short, since it need not have a second axial surface to be acted upon by a self-maintaining pressure. Thus, since the valve slide 920 does not have to be acted upon by pressure in order to hold the parking lock piston 931 in the disengaging position, neither is there produced in the parking lock valve 902 any leakage volume flow that has to be provided from the oil supply system. In the second shift position of the valve slide 910, in the pressure chambers 943 and 944 the shifting element pressure p_K1 of the shifting element 975 now acts upon the axial surface 915 and exerts on it an additional pressure force directed toward the stop 977.

If, with the selector lever in position "D", there occurs a power failure in the transmission control system, the pressure-regulator pressure p_D1 in the pressure chamber 941 of the parking lock valve 901 falls, so that the pressure force applied via the axial surface 914 is absent. Since to obtain a fail-safe gear in the event of a power failure, the shifting element 975 has to be pressurized, the shifting element pressure p_K1 of the shifting element 975 still present in the pressure chamber 944 acts on the axial surface 915 and thus, as a self-maintaining pressure, holds the valve slide 910 in its second shift position. Thereby the cylinder pressure chamber 932 is still pressurized with the main pressure p_MP, so the parking lock remains disengaged. Since in the disengaged condition of the parking lock, i.e. in position B of the parking lock piston 931, the parking lock valve 902 is cut off from the rest of the shifting device, it needs no self-maintaining pressure in order to keep the parking lock in the disengaged condition. For that reason the shifting element 985—if this is provided as a control pressure source—does not have to be closed in order to obtain a fail-safe gear or in the event of a power failure.

INDEXES

101 Parking lock valve
103 Parking lock cylinder
105 Control housing
110 Valve slide
111 Piston section
112 Piston section
113 Piston section
114 Axial surface
115 Axial surface
116 Recessed section
118 Spring
119 Spring guiding pin
131 Parking lock piston
132 Cylinder pressure chamber
133 Axial surface
141 Pressure chamber
142 Pressure chamber
143 Pressure chamber
144 Pressure chamber
145 Pressure chamber
148 Valve bore
149 Spring space
160 Vent
161 Line
162 Line
168 Diaphragm
170 Pressure oil supply
171 Pressure regulator
175 Shifting element
176 Stop
177 Stop
201 Parking lock valve
202 Parking lock valve
203 Parking lock cylinder
205 Control housing
210 Valve slide
211 Piston section
212 Piston section
214 Axial surface
215 Axial surface
218 Spring
219 Spring guiding pin
220 Valve slide
221 Piston section
222 Piston section
224 Axial surface
225 Axial surface
227 Recessed section
228 Spring
229 Spring guiding pin
231 Parking lock piston
232 Cylinder pressure chamber
233 Axial surface
241 Pressure chamber
242 Pressure chamber
243 Pressure chamber
248 Valve bore
249 Spring space
251 Pressure chamber
252 Pressure chamber
253 Pressure chamber
254 Pressure chamber
255 Pressure chamber
258 Valve bore
259 Spring space 260 Vent
261 Line
262 Line
263 Line
264 Line
265 Line
266 Branching point
268 Diaphragm
270 Pressure oil supply
276 Stop
277 Stop
281 Pressure regulator
285 Shifting element
286 Stop
287 Stop
301 Parking lock valve
302 Parking lock valve
303 Parking lock cylinder
305 Control housing
310 Valve slide
311 Piston section
312 Piston section
314 Axial surface
315 Axial surface
318 Spring
319 Spring guiding pin
320 Valve slide
321 Piston section
322 Piston section
324 Axial surface
325 Axial surface
328 Spring
329 Spring guiding pin
331 Parking lock piston
332 Cylinder pressure chamber
333 Axial surface
341 Pressure chamber
342 Pressure chamber
343 Pressure chamber
348 Valve bore
349 Spring space
351 Pressure chamber
352 Pressure chamber
353 Pressure chamber
358 Valve bore
360 Vent
362 Line
363 Line
364 Line
365 Line
368 Diaphragm
370 Pressure oil supply
371 Pressure regulator
375 Shifting element
376 Stop
377 Stop
385 Shifting element
386 Stop
387 Stop
401 Parking lock valve
402 Parking lock valve
403 Parking lock cylinder
405 Control housing
410 Valve slide
411 Piston section
412 Piston section
414 Axial surface
415 Axial surface
418 Spring
419 Spring guiding pin
420 Valve slide
421 Piston section
422 Piston section
424 Axial surface
425 Axial surface
428 Spring
429 Spring guiding pin
431 Parking lock piston
432 Cylinder pressure chamber
433 Axial surface
441 Pressure chamber
442 Pressure chamber
443 Pressure chamber
448 Valve bore
449 Spring space
451 Pressure chamber
452 Pressure chamber
453 Pressure chamber
454 Pressure chamber
458 Valve bore
459 Spring space
460 Vent
461 Line
462 Line
463 Line
464 Line
465 Line
468 Diaphragm
470 Pressure oil supply
471 Pressure regulator
475 Shifting element
476 Stop
477 Stop
486 Stop
487 Stop
501 Parking lock valve
502 Parking lock valve
503 Parking lock cylinder
505 Control housing
510 Valve slide
511 Piston section
512 Piston section
514 Axial surface
515 Axial surface
516 Recessed section
518 Spring
519 Spring guiding pin
520 Valve slide
521 Piston section
524 Axial surface
528 Spring
529 Spring guiding pin
531 Parking lock piston
532 Cylinder pressure chamber
533 Axial surface
534 Control groove
535 Pressure connection
536 Pressure connection
537 Cylinder bore
541 Pressure chamber
542 Pressure chamber
543 Pressure chamber
544 Pressure chamber
545 Pressure chamber 548 Valve bore
549 Spring space
551 Pressure chamber
552 Pressure chamber
558 Valve bore
559 Spring space
560 Vent
562 Line
563 Line
568 Diaphragm
570 Pressure oil supply
571 Pressure regulator
575 Shifting element
586 Stop
587 Stop
601 Parking lock valve
602 Parking lock valve
603 Parking lock cylinder
605 Control housing
610 Valve slide
611 Piston section
612 Piston section
614 Axial surface
615 Axial surface
616 Recessed section
618 Spring
619 Spring guiding pin
620 Valve slide
621 Piston section
624 Axial surface
625 Axial surface
628 Spring
629 Spring guiding pin
631 Parking lock piston
632 Cylinder pressure chamber
633 Axial surface
634 Control groove
635 Pressure connection
636 Pressure connection
641 Pressure chamber
642 Pressure chamber
643 Pressure chamber
644 Pressure chamber
645 Pressure chamber
648 Valve bore
649 Spring space
651 Pressure chamber
652 Pressure chamber
653 Pressure chamber
658 Valve bore
659 Spring space
660 Vent
661 Line
662 Line
663 Line
664 Line
665 Line
668 Diaphragm
670 Pressure oil supply
671 Pressure regulator
675 Shifting element
676 Stop
677 Stop
686 Stop
687 Stop
701 Parking lock valve
702 Parking lock valve
703 Parking lock cylinder
705 Control housing
710 Valve slide
711 Piston section
712 Piston section
714 Axial surface
715 Axial surface
716 Recessed section
717 Recessed section
719 Spring guiding pin
720 Valve slide
721 Piston section
722 Piston section
724 Axial surface
725 Axial surface
728 Spring
729 Spring guiding pin
731 Parking lock piston
732 Cylinder pressure chamber
734 Control groove
735 Pressure connection
736 Pressure connection
741 Pressure chamber
742 Pressure chamber
743 Pressure chamber
744 Pressure chamber
745 Pressure chamber
746 Pressure chamber
747 Pressure chamber
748 Valve bore
749 Spring space
751 Pressure chamber
752 Pressure chamber
758 Valve bore
759 Spring space
760 Vent
761 Line
762 Line
763 Line
764 Line
768 Diaphragm
770 Pressure oil supply
771 Pressure regulator
775 Shifting element
776 Stop
777 Stop
786 Stop
787 Stop
801 Parking lock valve
802 Parking lock valve
803 Parking lock cylinder
805 Control housing
810 Valve slide
811 Piston section
812 Piston section
813 Piston section
814 Axial surface
815 Axial surface
816 Axial surface
817 Recessed section
818 Spring
819 Spring guiding pin
820 Valve slide
821 Piston section
822 Piston section
823 Piston section
824 Axial surface 825 Axial surface
827 Recessed section
828 Spring
829 Spring guiding pin
831 Parking lock piston
832 Cylinder pressure chamber
841 Pressure chamber
842 Pressure chamber
843 Pressure chamber
844 Pressure chamber
845 Pressure chamber
848 Valve bore
849 Spring space
851 Pressure chamber
852 Pressure chamber
853 Pressure chamber
854 Pressure chamber
855 Pressure chamber
858 Valve bore
859 Spring space
860 Vent
861 Line
862 Line
863 Line
866 Branching point
868 Diaphragm
870 Pressure oil supply
876 Stop
877 Stop
881 Pressure regulator
885 Shifting element
886 Stop
887 Stop
901 Parking lock valve
902 Parking lock valve
903 Parking lock cylinder
905 Control housing
910 Valve slide
911 Piston section
912 Piston section
913 Piston section
914 Axial surface
915 Axial surface
916 Recessed section
917 Recessed section
918 Spring
919 Spring guiding pin
920 Valve slide
921 Piston section
924 Axial surface
928 Spring
929 Spring guiding pin
931 Parking lock piston
932 Cylinder pressure chamber
933 Axial surface
934 Control groove
941 Pressure chamber
942 Pressure chamber
943 Pressure chamber
944 Pressure chamber
945 Pressure chamber
946 Pressure chamber
947 Pressure chamber
948 Valve bore
949 Spring space
951 Pressure chamber
952 Pressure chamber
958 Valve bore
959 Spring space
960 Vent
962 Line
963 Line
968 Diaphragm
970 Pressure oil supply
971 Pressure regulator
975 Shifting element
976 Stop
977 Stop
981 Pressure regulator
985 Shifting element
986 Stop
987 Stop
A Position of the parking lock piston when the parking lock is engaged
B Position of the parking lock piston when the parking lock is disengaged
M Central axis
p_0 Ambient pressure
p_D Pressure-regulator pressure
p_D1 Pressure-regulator pressure
p_D2 Pressure-regulator pressure
p_K Shifting element pressure
p_K1 Shifting element pressure
p_K2 Shifting element pressure
p_MP Main pressure

The invention claimed is:

1. A hydraulic shifting device, for an automatic transmission, for engaging and disengaging a parking lock, the hydraulic shifting device comprising:
a parking lock cylinder (203) for actuating the parking lock, and
a first parking lock valve (201) which, for hydraulic control of the parking lock cylinder (203), is movable into at least first and second shift positions,
the hydraulic shifting device comprising a second parking lock valve (202), and
the first and the second parking lock valves (201, 202) and the parking lock cylinder (203) being designed and connected with one another in such manner that the parking lock only being disengagable by pressurization of the parking lock cylinder (203) provided that the first and the second parking lock valves (201, 202) are each in a particular shift position,
wherein the first and the second parking lock valves (201, 202) each have a respective switching component (210, 220) and are each designed as directional control valves that are switchable to the first and the second shift positions, and the parking lock cylinder (203) comprises a parking lock piston (231) for actuating the parking lock, the first parking lock valve (201) is connected to at least one source of working pressure (270) and, in the first shift position of the first parking lock valve (201), the parking lock cylinder (203) is connected by the first parking lock valve (201) to a vent (260) regardless of the shift position of the second parking lock valve (202) and the parking lock (203) is thus engaged, and, in the second shift position of the first and the second parking lock valves (201, 202), the first parking lock valve (201) connects a working pressure source (270) to the parking lock cylinder (203) and the connection between the parking lock cylinder (203) and the vent (260) is either interrupted or throttled by both the first and the second parking lock valve (201, 202) such that a working pressure (p_MP), in the parking lock cylinder (203), can increase to a value such that the parking lock piston (231) is actuated so as to disengage the parking lock.

2. The hydraulic shifting device according to claim 1, wherein the first and the second parking lock valves (201, 202) are each hydraulically actuated.

3. The hydraulic shifting device according to claim 1, wherein the first and the second parking lock valves (201, 202) are connected to at least one control pressure source (270, 281, 285) such that, by virtue of control pressures (p_MP, p_D2, p_K2) produced in the at least one control pressure source, the respective switching components (210, 220) are each moved to the second shift position, of the first and the second parking lock valves (201, 202), and held in the second shift position.

4. The hydraulic shifting device according to claim 3, wherein the respective switching component of each of the first and the second parking lock valves (201, 202) is a valve slide (210, 220) which is movable within a valve bore (248, 258), between two stops (276, 277, 286, 287), to the first and the second shift position,
each valve bore extends through a plurality of pressure chambers (241, 242, 243, 251 to 255),
at least one of the plurality of pressure chambers (241, 242, 251, 254) is connected to the at least one control pressure source (270, 281, 287) such that the control pressure (p_D2, p_K2, p_MP) produced in the at least one control pressure source acts in a desired ones of the plurality of pressure chambers (241, 242, 251, 254),
each of the valve slides (210, 220) has at least one axial surface (214, 215, 224, 225) which, together with the respective one of the plurality of the pressure chambers (241, 242, 251, 254), is also acted upon by the control pressure (p_D2, p_K2, p_MP) such that an axially directed force acts upon the respective valve slide (210, 220) in a direction toward the second shift position.

5. The hydraulic shifting device according to claim 4, wherein at least one of the first and the second parking lock valves (202) is designed such that, in the first shift position, the respective valve slide (220) is only acted upon by a first control pressure (p_D2) and, in the second shift position, additionally by a second control pressure (p_K2) such that an axially directed force acts upon the respective valve slide in the direction toward the second shift position.

6. The hydraulic shifting device according to claim 4, wherein at least one of the first and the second parking lock valves (501) is designed such that, in the first shift position, the respective valve slide (510) is acted upon by a first control pressure (p_D1) and by a second control pressure (p_K2) such that an axially directed force acts upon the respective valve slide in the direction toward the second shift position.

7. The hydraulic shifting device according to claim 4, wherein at least in one of the first and the second parking lock valves (501), in the second shift position when the parking lock is disengaged, the valve slide (510) is acted upon by a control pressure (p_K1) which is effective even if a power failure occurs in the transmission control system such that an axially directed force is applied to the valve slide in the direction toward the second shift position.

8. The hydraulic shifting device according to claim 4, wherein the connection of a working pressure source (570) to a vent (560), to the second parking lock valve (502) and to the parking lock cylinder (503), is interrupted by the valve slide (510, 513) of the first parking lock valve (501) in its first shift position.

9. The hydraulic shifting device according to claim 4, wherein the first and the second parking lock valves (501, 502) are connected to different control pressure sources (571, 575, 581, 585).

10. The hydraulic shifting device according to claim 4, wherein the first and the second parking lock valves (401, 402) are connected to a common control pressure source (471), and the pressure chambers and the valve slides of the first and the second parking lock valves are designed such that, in the first shift position of the two valve slides (410, 420), only one of the two valve slides (410) is acted upon by an axially directed pressure force from the pressure source (471).

11. The hydraulic shifting device according to claim 4, wherein the valve bores (848, 858) of the first and the second parking lock valves (801, 802) have a common central axis (M).

12. The hydraulic shifting device according to claim 1, wherein the first parking lock valve (201) and the working pressure source (270) are connected to the parking lock cylinder (203) by way of the second parking lock valve (202).

13. The hydraulic shifting device according to claim 1, wherein
the first parking lock valve (501) is connected directly to the parking lock cylinder (503) so that the working pressure source (570) is only connectable to the parking lock cylinder (503) by the first parking lock valve (501), and
the first parking lock valve (501) and the working pressure source (570) are connectable to the second parking lock valve (502) by the parking lock cylinder (503).

14. The hydraulic shifting device according to claim 13, wherein the second parking lock cylinder (502) has at least first and second pressure connections (535, 536) such that the first pressure connection (535) is directly connected to the first parking lock valve (501) and the second pressure connection (536) is directly connected to the second parking lock valve (502), and a parking lock piston (531) is designed such that the parking lock cylinder (503) acts as a switching valve by which the first and the second pressure connections (535, 536) are connectable to one another.

15. The hydraulic shifting device according to claim 14, wherein the parking lock piston (531) comprises a control groove (534) by which the first and the second pressure connections (535, 536), and hence the first and the second parking lock valves (501, 502), are connectable to one another in a first position (A) of the parking lock piston (531) with the parking lock engaged, whereas in a second position (B), with the parking lock disengaged, the first and the second parking lock valves are separated from one another.

16. The hydraulic shifting device according to claim 13, wherein the second parking lock valve (502) is only actuatable by a single control pressure source (581 or 585).

17. The hydraulic shifting device according to claim 1, wherein
the first parking lock valve (201) comprises a valve slide (210);
the valve slide (210) has two piston sections (211, 212) of different diameter and movable within a stepped bore (248);
the first parking lock valve (201) is axially actuated to the second shift position by a working pressure (p_MP) provided by a first pressure source (270);
the second parking lock valve (202) is axially actuated to the second shift position by a working pressure (p_D2) supplied by a second pressure source (281), and the second parking lock valve (202) can be maintained in the second shift position by both the working pressure (p_D2) from the second pressure source (281) and a working pressure (p_K2) from a third pressure source (285).

18. An automatic transmission in combination with a hydraulic shifting device for engaging and disengaging a parking lock, the hydraulic shifting device comprising:
a parking lock cylinder (203) for actuating the parking lock,
a first parking lock valve (201) which, for hydraulic control of the parking lock cylinder (203), being connected to a working pressure source and being movable to at least first and second shift positions, and
a second parking lock valve (202) being movable to at least first and second shift positions,
the first and the second parking lock valves (201, 202) and the parking lock cylinder (203) being designed and connected with one another in such manner that the parking lock only being disengagable by pressurization of the parking lock cylinder (203) provided that the first and the second parking lock valves (201, 202) are each in a particular shift position,
wherein, when the first parking lock valve (201) is in a first shift position, the parking lock cylinder is connected, via the first parking lock valve (201), to a vent (260) regardless of a shift position of the second parking lock valve (202) and the parking lock is thus engaged.

19. A hydraulic shifting device for an automatic transmission, for engaging and disengaging a parking lock, the hydraulic shifting device comprising:
a parking lock cylinder (203) comprises a parking lock piston (231) that is shiftable between a first position, in which parking lock is engaged, and a second shift position in which the parking lock is disengaged;
a first parking lock valve (201) comprising a valve slide (210) being shiftable between at least first and second shift positions, and the first parking lock valve (201) being connected to a working pressure (p_MP);
a second parking lock valve (202) comprising a valve slide (210) being shiftable between at least first and second shift positions; and
the first and the second parking lock valves (201, 202) and the parking lock cylinder (203) being connected with one another such that the parking lock cylinder (203) being shifted to the first position, in which the parking lock is disengaged, only if the first parking lock valve (201) is shifted to a particular one of the first and the second shift positions and the second parking lock valve (202) is shifted to a particular one of the first and the second shift positions;
wherein the parking lock cylinder (203) is connected, via the first parking lock valve (201), to a vent (260) such that when the first parking lock valve (201) is in the first shift position and the second parking lock valve (202) is in either the first or the second shift positions, the parking lock piston (231) is shifted to a position in which the parking lock is engaged.

20. The hydraulic shifting device according to claim 19, wherein the parking lock cylinder (203) is connected, via the second parking lock valve (202), to a vent (260) such that when the second parking lock valve (202) is in the first shift position and the first parking lock valve (201) is in either the first or the second shift positions, the parking lock piston (231) is shifted to the position in which the parking lock is engaged, and when the first and the second parking lock valves (201, 202) are respectively in the second shift position, the parking lock cylinder (203) is connected, via the first parking lock valve (201), to the working pressure (p_MP) and the parking lock cylinder (203) is disconnected from the vent (260) such that the parking lock piston (231) is shifted to the position in which the parking lock is disengaged.

* * * * *